(12) United States Patent
Yeung et al.

(10) Patent No.: US 12,497,879 B2
(45) Date of Patent: Dec. 16, 2025

(54) POWER SOURCES AND TRANSMISSION NETWORKS FOR AUXILIARY EQUIPMENT ONBOARD HYDRAULIC FRACTURING UNITS AND ASSOCIATED METHODS

(71) Applicant: BJ Energy Solutions, LLC, The Woodlands, TX (US)

(72) Inventors: Tony Yeung, The Woodlands, TX (US); Ricardo Rodriguez-Ramon, The Woodlands, TX (US); Joseph Foster, The Woodlands, TX (US); Nicholas Tew, The Woodlands, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

(21) Appl. No.: 18/516,567

(22) Filed: Nov. 21, 2023

(65) Prior Publication Data
US 2024/0093583 A1 Mar. 21, 2024

Related U.S. Application Data

(60) Continuation of application No. 18/116,383, filed on Mar. 2, 2023, now Pat. No. 11,859,482, which is a
(Continued)

(51) Int. Cl.
*E21B 43/26* (2006.01)
*F04B 9/02* (2006.01)
(Continued)

(52) U.S. Cl.
CPC ............ *E21B 43/2607* (2020.05); *F04B 9/02* (2013.01); *F04B 15/02* (2013.01); *F04B 17/03* (2013.01);
(Continued)

(58) Field of Classification Search
CPC .......... F04B 15/02; F04B 17/03; F04B 17/05; F04B 9/02; E21B 43/2607; H02J 7/34; H02J 9/062; H02J 9/00
(Continued)

(56) References Cited

U.S. PATENT DOCUMENTS 1,442,239 A   1/1923   Stoltz
1,563,413 A   12/1925  Whitcomb
(Continued)

FOREIGN PATENT DOCUMENTS

AU   9609498 A    7/1999
AU   737970 B2    9/2001
(Continued)

OTHER PUBLICATIONS

4-Star Hose & Supply: "Frac Tank Hose (FRAC)," 1 Page, [Retrieved on Nov. 10, 2019] Retrieved from URL: http://www.4starhose.com/product/frac_tank_hose_frac.aspx.
(Continued)

*Primary Examiner* — Charles G Freay
(74) *Attorney, Agent, or Firm* — Norton Rose Fulbright US LLP

(57) ABSTRACT

Embodiments of systems and methods disclosed provide a hydraulic fracturing unit that includes a reciprocating plunger pump configured to pump a fracturing fluid and a powertrain configured to power the reciprocating plunger pump. The powertrain includes a prime mover and a drivetrain, the prime mover including a gas turbine engine. The hydraulic fracturing unit also includes auxiliary equipment configured to support operation of the hydraulic fracturing unit including the reciprocating plunger pump and the powertrain. A power system is configured to power the auxiliary equipment. The power system includes a power source and a power network. The power source is configured
(Continued)

to generate power for the auxiliary equipment. The power network is coupled to the power source and the auxiliary equipment, and configured to deliver the power generated by the power source to the auxiliary equipment. Associated systems including a plurality of hydraulic fracturing units are also provided.

19 Claims, 18 Drawing Sheets

Related U.S. Application Data continuation of application No. 17/976,095, filed on Oct. 28, 2022, now Pat. No. 11,629,584, which is a continuation of application No. 17/555,815, filed on Dec. 20, 2021, now Pat. No. 11,530,602, which is a continuation of application No. 17/203,002, filed on Mar. 16, 2021, now Pat. No. 11,236,739, which is a division of application No. 16/946,079, filed on Jun. 5, 2020, now Pat. No. 10,989,180.

(60) Provisional application No. 62/899,971, filed on Sep. 13, 2019.

(51) Int. Cl.
| | | |
|---|---|---|
| *F04B 15/02* | (2006.01) | |
| *F04B 17/03* | (2006.01) | |
| *F04B 17/05* | (2006.01) | |
| *F04B 23/04* | (2006.01) | |
| *F04B 53/08* | (2006.01) | |
| *F04B 53/18* | (2006.01) | |
| *H02J 7/34* | (2006.01) | |
| *H02J 9/00* | (2006.01) | |
| *H02J 9/06* | (2006.01) | |
| *H02K 7/18* | (2006.01) | |
| *F01M 1/02* | (2006.01) | |
| *F01M 1/12* | (2006.01) | |
| *F01P 3/20* | (2006.01) | |

(52) U.S. Cl.
CPC .............. *F04B 17/05* (2013.01); *F04B 23/04* (2013.01); *F04B 53/08* (2013.01); *F04B 53/18* (2013.01); *H02J 7/34* (2013.01); *H02J 9/00* (2013.01); *H02J 9/06* (2013.01); *H02J 9/062* (2013.01); *H02J 9/066* (2013.01); *H02K 7/1823* (2013.01); *F01M 1/02* (2013.01); *F01M 2001/0253* (2013.01); *F01M 1/12* (2013.01); *F01P 3/20* (2013.01)

(58) Field of Classification Search
USPC ..................................................... 307/64–67
See application file for complete search history.

(56) References Cited

U.S. PATENT DOCUMENTS

| | | | |
|---|---|---|---|
| 1,716,049 | A | 6/1929 | Greve |
| 1,726,633 | A | 9/1929 | Smith |
| 2,178,662 | A | 11/1939 | Lars et al. |
| 2,331,070 | A | 10/1943 | Cornelious |
| 2,427,638 | A | 9/1947 | Vilter et al. |
| 2,498,229 | A | 2/1950 | Adler |
| 2,535,703 | A | 12/1950 | Smith et al. |
| 2,572,711 | A | 10/1951 | Fischer, V |
| 2,820,341 | A | 1/1958 | Amann |
| 2,868,004 | A | 1/1959 | Runde |
| 2,940,377 | A | 6/1960 | Darnell et al. |
| 2,947,141 | A | 8/1960 | Russ |
| 2,956,738 | A | 10/1960 | Af Rosenschold et al. |
| 3,068,796 | A | 12/1962 | Pfluger et al. |
| 3,191,517 | A | 6/1965 | Solzman |
| 3,257,031 | A | 6/1966 | Dietz |
| 3,274,768 | A | 9/1966 | Hans-Christof et al. |
| 3,378,074 | A | 4/1968 | Kiel |
| 3,382,671 | A | 5/1968 | Ehni, III et al. |
| 3,401,873 | A | 9/1968 | Privon et al. |
| 3,463,612 | A | 8/1969 | Whitsel, Jr. et al. |
| 3,496,880 | A | 2/1970 | Wolff et al. |
| 3,550,696 | A | 12/1970 | Kenneday et al. |
| 3,560,053 | A | 2/1971 | Ortloff et al. |
| 3,586,459 | A | 6/1971 | Zerlauth et al. |
| 3,632,222 | A | 1/1972 | Cronstedt et al. |
| 3,656,582 | A | 4/1972 | Alcock et al. |
| 3,667,868 | A | 6/1972 | Brunner et al. |
| 3,692,434 | A | 9/1972 | Schnear et al. |
| 3,695,808 | A | 10/1972 | Beneze et al. |
| 3,739,872 | A | 6/1973 | McNair et al. |
| 3,757,581 | A | 9/1973 | Mankin et al. |
| 3,759,063 | A | 9/1973 | Bendall et al. |
| 3,765,173 | A | 10/1973 | Harris et al. |
| 3,771,916 | A | 11/1973 | Flanigan et al. |
| 3,773,438 | A | 11/1973 | Hall et al. |
| 3,781,135 | A | 12/1973 | Nickell et al. |
| 3,786,835 | A | 1/1974 | Finger et al. |
| 3,791,682 | A | 2/1974 | Mitchell et al. |
| 3,796,045 | A | 3/1974 | Foster et al. |
| 3,801,394 | A | 4/1974 | Alexander et al. |
| 3,814,549 | A | 6/1974 | Cronstedt et al. |
| 3,820,922 | A | 6/1974 | Buse et al. |
| 3,847,511 | A | 11/1974 | Cole et al. |
| 3,866,108 | A | 2/1975 | Yannone et al. |
| 3,875,380 | A | 4/1975 | Rankin |
| 3,963,372 | A | 6/1976 | McLain et al. |
| 4,010,613 | A | 3/1977 | McInerney |
| 4,019,477 | A | 4/1977 | Overton |
| 4,031,407 | A | 6/1977 | Reed |
| 4,050,862 | A | 9/1977 | Buse |
| 4,059,045 | A | 11/1977 | McClain |
| 4,086,976 | A | 5/1978 | Holm et al. |
| 4,117,342 | A | 9/1978 | Melley, Jr. et al. |
| 4,147,230 | A | 4/1979 | Ormond et al. |
| 4,173,121 | A | 11/1979 | Yu |
| 4,204,808 | A | 5/1980 | Clayton et al. |
| 4,209,079 | A | 6/1980 | Deschamps et al. |
| 4,209,979 | A | 7/1980 | Mattson et al. |
| 4,222,229 | A | 9/1980 | Uram |
| 4,239,396 | A | 12/1980 | Arribau et al. |
| 4,269,569 | A | 5/1981 | Hoover |
| 4,311,395 | A | 1/1982 | Douthitt et al. |
| 4,330,237 | A | 5/1982 | Battah |
| 4,341,508 | A | 7/1982 | Rambin, Jr. et al. |
| 4,357,027 | A | 11/1982 | Zeitlow |
| 4,383,478 | A | 5/1983 | Jones et al. |
| 4,402,504 | A | 9/1983 | Christian |
| 4,430,047 | A | 2/1984 | Ilg |
| 4,442,665 | A | 4/1984 | Fick et al. |
| 4,457,325 | A | 7/1984 | Green |
| 4,470,771 | A | 9/1984 | Hall et al. |
| 4,483,684 | A | 11/1984 | Black |
| 4,505,650 | A | 3/1985 | Hannett et al. |
| 4,574,880 | A | 3/1986 | Handke |
| 4,584,654 | A | 4/1986 | Crane |
| 4,620,330 | A | 11/1986 | Izzi, Sr. |
| 4,672,813 | A | 6/1987 | David |
| 4,697,668 | A | 10/1987 | Barker |
| 4,754,607 | A | 7/1988 | Mackay |
| 4,782,244 | A | 11/1988 | Wakimoto |
| 4,796,777 | A | 1/1989 | Keller |
| 4,804,162 | A | 2/1989 | Rice |
| 4,869,209 | A | 9/1989 | Young |
| 4,913,625 | A | 4/1990 | Gerlowski |
| 4,983,259 | A | 1/1991 | Duncan et al. |
| 4,990,058 | A | 2/1991 | Eslinger |
| 5,032,065 | A | 7/1991 | Yamamuro et al. |
| 5,135,361 | A | 8/1992 | Dion |
| 5,167,493 | A | 12/1992 | Kobari |
| 5,245,970 | A | 9/1993 | Iwaszkiewicz et al. |
| 5,271,750 | A | 12/1993 | Abbott et al. |

(56) References Cited

U.S. PATENT DOCUMENTS

| | | |
|---|---|---|
| 5,291,842 A | 3/1994 | Sallstrom et al. |
| 5,326,231 A | 7/1994 | Pandeya et al. |
| 5,362,219 A | 11/1994 | Paul et al. |
| 5,403,367 A | 4/1995 | De Villiers et al. |
| 5,511,956 A | 4/1996 | Hasegawa et al. |
| 5,517,822 A | 5/1996 | Haws et al. |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik et al. |
| 5,626,103 A | 5/1997 | Haws et al. |
| 5,634,777 A | 6/1997 | Albertin et al. |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,761,084 A | 6/1998 | Edwards |
| 5,811,676 A | 9/1998 | Spalding et al. |
| 5,839,888 A | 11/1998 | Harrison |
| 5,846,062 A | 12/1998 | Yanagisawa et al. |
| 5,875,744 A | 3/1999 | Vallejos |
| 5,983,962 A | 11/1999 | Gerardot |
| 5,992,944 A | 11/1999 | Hara |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,250,068 B1 | 6/2001 | Tajima et al. |
| 6,279,309 B1 | 8/2001 | Lawlor et al. |
| 6,321,860 B1 | 11/2001 | Reddoch |
| 6,334,746 B1 | 1/2002 | Nguyen et al. |
| 6,388,317 B1 | 5/2002 | Reese |
| 6,401,472 B2 | 6/2002 | Pollrich et al. |
| 6,530,224 B1 | 3/2003 | Conchieri |
| 6,543,395 B2 | 4/2003 | Green |
| 6,655,922 B1 | 12/2003 | Flek |
| 6,669,453 B1 | 12/2003 | Breeden et al. |
| 6,765,304 B2 | 7/2004 | Baten et al. |
| 6,786,051 B2 | 9/2004 | Kristich et al. |
| 6,832,900 B2 | 12/2004 | Leu |
| 6,851,514 B2 | 2/2005 | Han et al. |
| 6,859,740 B2 | 2/2005 | Stephenson et al. |
| 6,901,735 B2 | 6/2005 | Lohn |
| 6,962,057 B2 | 11/2005 | Kurokawa et al. |
| 7,007,966 B2 | 3/2006 | Campion |
| 7,047,747 B2 | 5/2006 | Tanaka |
| 7,065,953 B1 | 6/2006 | Kopko |
| 7,143,016 B1 | 11/2006 | Discenzo et al. |
| 7,222,015 B2 | 5/2007 | Davis et al. |
| 7,281,519 B2 | 10/2007 | Schroeder et al. |
| 7,388,303 B2 | 6/2008 | Seiver |
| 7,404,294 B2 | 7/2008 | Sundin |
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,581,379 B2 | 9/2009 | Yoshida et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,632,339 B2 | 12/2009 | Singh |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Hoeckner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander et al. |
| 8,167,980 B2 | 5/2012 | Hiner et al. |
| 8,182,587 B2 | 5/2012 | Hiner et al. |
| 8,186,334 B2 | 5/2012 | Ooyama |
| 8,196,555 B2 | 6/2012 | Ikeda et al. |
| 8,202,354 B2 | 6/2012 | Iijima |
| 8,273,158 B2 | 9/2012 | Jarrier et al. |
| 8,292,216 B1 | 10/2012 | Rumberger, Jr. |
| 8,303,678 B2 | 11/2012 | Steele et al. |
| 8,316,936 B2 | 11/2012 | Roddy et al. |
| 8,336,631 B2 | 12/2012 | Shampine et al. |
| 8,337,597 B2 | 12/2012 | Chillar et al. |
| 8,388,317 B2 | 3/2013 | Sung |
| 8,414,673 B2 | 4/2013 | Raje et al. |
| 8,465,573 B2 | 6/2013 | Sullivan et al. |
| 8,469,826 B2 | 6/2013 | Brosowske |
| 8,491,687 B1 | 7/2013 | Wann |
| 8,500,215 B2 | 8/2013 | Gastauer et al. |
| 8,506,267 B2 * | 8/2013 | Gambier ................ F04B 17/06 417/244 |
| 8,518,160 B2 | 8/2013 | Mann |
| 8,575,873 B2 | 11/2013 | Peterson et al. |
| 8,616,005 B1 | 12/2013 | Cousino, Sr. |
| 8,621,873 B2 | 1/2014 | Robertson et al. |
| 8,641,399 B2 | 2/2014 | Mucibabic et al. |
| 8,656,990 B2 | 2/2014 | Kajaria et al. |
| 8,672,606 B2 | 3/2014 | Glynn et al. |
| 8,673,040 B2 | 3/2014 | Handley et al. |
| 8,690,980 B2 | 4/2014 | Eyers et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,721,753 B2 | 5/2014 | Ayshford |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,840,364 B2 | 9/2014 | Warton et al. |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,249,733 B2 | 2/2016 | Hallam et al. |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |

(56) References Cited

U.S. PATENT DOCUMENTS

| | | |
|---|---|---|
| 9,394,829 B2 | 7/2016 | Cabeen et al. |
| 9,395,049 B2 | 7/2016 | Vicknair et al. |
| 9,401,670 B2 | 7/2016 | Minato |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux, Jr. et al. |
| 9,534,473 B2 | 1/2017 | Morris et al. |
| 9,546,652 B2 | 1/2017 | Yin |
| 9,550,501 B2 | 1/2017 | Ledbetter et al. |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,650,879 B2 | 5/2017 | Broussard et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oehring et al. |
| 9,845,730 B2 | 12/2017 | Betti et al. |
| 9,850,422 B2 | 12/2017 | Lestz et al. |
| 9,856,131 B1 | 1/2018 | Moffitt, Jr. |
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dille et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Morales et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,125,750 B2 | 11/2018 | Pfaff et al. |
| 10,134,257 B2 | 11/2018 | Zhang et al. |
| 10,138,098 B2 | 11/2018 | Sørensen et al. |
| 10,151,244 B2 | 12/2018 | Giancotti et al. |
| 10,161,423 B2 | 12/2018 | Rampen et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan et al. |
| 10,337,402 B2 | 7/2019 | Austin et al. |
| 10,358,035 B2 | 7/2019 | Cryer et al. |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| 10,415,563 B2 | 9/2019 | Robinson et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,805 B2 | 3/2020 | Kersey et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,648,531 B2 | 5/2020 | Maienschein et al. |
| 10,655,516 B2 | 5/2020 | Kulkarni et al. |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,104 B2 | 11/2020 | Rochin et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,892,596 B2 | 1/2021 | Enya et al. |
| 10,895,202 B1 | 1/2021 | Yeung et al. |
| 10,900,475 B2 | 1/2021 | Weightman et al. |
| 10,907,459 B1 | 2/2021 | Yeung et al. |
| 10,907,698 B2 | 2/2021 | Moreno |
| 10,927,774 B2 | 2/2021 | Cai et al. |
| 10,927,802 B2 | 2/2021 | Oehring et al. |
| 10,954,770 B1 | 3/2021 | Yeung et al. |
| 10,954,855 B1 | 3/2021 | Ji et al. |
| 10,961,614 B1 | 3/2021 | Djavanroodi |
| 10,961,908 B1 | 3/2021 | Yeung et al. |
| 10,961,912 B1 | 3/2021 | Yeung et al. |
| 10,961,914 B1 | 3/2021 | Yeung et al. |

(56) References Cited

U.S. PATENT DOCUMENTS

| | | |
|---|---|---|
| 10,961,993 B1 | 3/2021 | Ji et al. |
| 10,961,995 B2 | 3/2021 | Mayorca |
| 10,968,837 B1 | 4/2021 | Yeung et al. |
| 10,982,523 B1 | 4/2021 | Hill et al. |
| 10,982,596 B1 | 4/2021 | Yeung et al. |
| 10,989,019 B2 | 4/2021 | Cai et al. |
| 10,989,180 B2 | 4/2021 | Yeung et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,014,444 B2 | 5/2021 | Wetzel |
| 11,015,423 B1 | 5/2021 | Yeung et al. |
| 11,015,536 B2 | 5/2021 | Yeung et al. |
| 11,015,594 B2 | 5/2021 | Yeung et al. |
| 11,022,526 B1 | 6/2021 | Yeung et al. |
| 11,028,677 B1 | 6/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,066,915 B1 | 7/2021 | Yeung et al. |
| 11,068,455 B2 | 7/2021 | Shabi et al. |
| 11,085,281 B1 | 8/2021 | Yeung et al. |
| 11,085,282 B2 | 8/2021 | Mazrooee et al. |
| 11,092,152 B2 | 8/2021 | Yeung et al. |
| 11,098,651 B1 | 8/2021 | Yeung et al. |
| 11,105,250 B1 | 8/2021 | Zhang et al. |
| 11,105,266 B2 | 8/2021 | Zhou et al. |
| 11,109,508 B1 | 8/2021 | Yeung et al. |
| 11,111,768 B1 | 9/2021 | Yeung et al. |
| 11,125,066 B1 | 9/2021 | Yeung et al. |
| 11,125,156 B2 | 9/2021 | Zhang et al. |
| 11,129,295 B1 | 9/2021 | Yeung et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,149,533 B1 | 10/2021 | Yeung et al. |
| 11,149,726 B1 | 10/2021 | Yeung et al. |
| 11,156,159 B1 | 10/2021 | Yeung et al. |
| 11,168,681 B2 | 11/2021 | Boguski et al. |
| 11,174,716 B1 | 11/2021 | Yeung et al. |
| 11,193,360 B1 | 12/2021 | Yeung et al. |
| 11,193,361 B1 | 12/2021 | Yeung et al. |
| 11,205,880 B1 | 12/2021 | Zhou |
| 11,205,881 B2 | 12/2021 | Makino |
| 11,208,879 B1 | 12/2021 | Yeung et al. |
| 11,208,953 B1 | 12/2021 | Yeung et al. |
| 11,220,895 B1 | 1/2022 | Yeung et al. |
| 11,236,739 B2 * | 2/2022 | Yeung .................. H02J 9/062 |
| 11,242,737 B2 | 2/2022 | Zhang et al. |
| 11,242,802 B2 | 2/2022 | Yeung et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| 11,280,331 B2 | 3/2022 | Yeung et al. |
| 11,306,835 B1 | 4/2022 | Dille et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,415,056 B1 | 8/2022 | Yeung et al. |
| 11,428,165 B2 | 8/2022 | Yeung et al. |
| 11,441,483 B2 | 9/2022 | Li et al. |
| 11,448,122 B2 | 9/2022 | Feng et al. |
| 11,459,954 B2 | 10/2022 | Yeung et al. |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung et al. |
| 11,519,395 B2 | 12/2022 | Zhang et al. |
| 11,519,405 B2 | 12/2022 | Deng et al. |
| 11,530,602 B2 * | 12/2022 | Yeung .................. H02J 9/066 |
| 11,549,349 B2 | 1/2023 | Wang et al. |
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2 | 1/2023 | Yeung et al. |
| 11,560,848 B2 | 1/2023 | Yeung et al. |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2 | 3/2023 | Yeung et al. |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,584 B2 * | 4/2023 | Yeung .................. H02J 9/066 |
| | | 166/308.1 |
| 11,629,589 B2 | 4/2023 | Lin et al. |
| 11,649,766 B1 | 5/2023 | Yeung et al. |
| 11,655,763 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 11,767,791 B2 | 9/2023 | Yeung et al. |
| 11,859,482 B2 * | 1/2024 | Yeung .................. F04B 23/06 |
| 11,971,028 B2 | 4/2024 | Yeung et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187689 A1 | 9/2004 | Sporre et al. |
| 2004/0187950 A1 | 9/2004 | Cohen et al. |
| 2004/0219040 A1 | 11/2004 | Kugelev et al. |
| 2004/0255783 A1 | 12/2004 | Graham et al. |
| 2005/0051322 A1 | 3/2005 | Speer |
| 2005/0056081 A1 | 3/2005 | Gocho |
| 2005/0120881 A1 | 6/2005 | Sporre et al. |
| 2005/0139286 A1 | 6/2005 | Poulter et al. |
| 2005/0191169 A1 | 9/2005 | Cuvelier et al. |
| 2005/0196298 A1 | 9/2005 | Manning |
| 2005/0226754 A1 | 10/2005 | Orr et al. |
| 2005/0274094 A1 | 12/2005 | Demarco |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0112825 A1 | 6/2006 | Renwart et al. |
| 2006/0196251 A1 | 9/2006 | Richey |
| 2006/0211356 A1 | 9/2006 | Grassman |
| 2006/0225402 A1 | 10/2006 | Kierspe et al. |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0006250 A1 | 1/2008 | Bula et al. |
| 2008/0048456 A1 | 2/2008 | Browning et al. |

(56) References Cited

U.S. PATENT DOCUMENTS

| | | |
|---|---|---|
| 2008/0098891 A1 | 5/2008 | Feher et al. |
| 2008/0161974 A1 | 7/2008 | Alston |
| 2008/0187431 A1 | 8/2008 | Brown et al. |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst et al. |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere |
| 2009/0178412 A1 | 7/2009 | Spytek |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0050873 A1 | 3/2010 | Hiner et al. |
| 2010/0054919 A1 | 3/2010 | Hiner et al. |
| 2010/0071899 A1 | 3/2010 | Coquilleau et al. |
| 2010/0119304 A1 | 5/2010 | Nelson et al. |
| 2010/0154631 A1 | 6/2010 | Chillar et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0083419 A1 | 4/2011 | Upadhyay et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0154991 A1 | 6/2011 | Steele et al. |
| 2011/0173991 A1 | 7/2011 | Dean et al. |
| 2011/0197988 A1 | 8/2011 | Van Vliet et al. |
| 2011/0241888 A1 | 10/2011 | Lu et al. |
| 2011/0265443 A1 | 11/2011 | Ansari et al. |
| 2011/0272158 A1 | 11/2011 | Neal |
| 2011/0277430 A1 | 11/2011 | Nicholas |
| 2012/0000168 A1 | 1/2012 | Chaudhari et al. |
| 2012/0023973 A1 | 2/2012 | Mayorca |
| 2012/0047855 A1 | 3/2012 | Eyers et al. |
| 2012/0048242 A1 | 3/2012 | Surnilla et al. |
| 2012/0085541 A1 | 4/2012 | Love et al. |
| 2012/0117930 A1 | 5/2012 | Nicholas |
| 2012/0124961 A1 | 5/2012 | Jarrier et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204525 A1 | 8/2012 | Jarrier |
| 2012/0204568 A1 | 8/2012 | Jarrier |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324843 A1 | 12/2012 | Saraswathi et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0111859 A1 | 5/2013 | Bryant |
| 2013/0134702 A1 | 5/2013 | Boraas et al. |
| 2013/0174764 A1 | 7/2013 | Warton et al. |
| 2013/0189915 A1 | 7/2013 | Hazard |
| 2013/0193127 A1 | 8/2013 | Scipio et al. |
| 2013/0205798 A1 | 8/2013 | Kwok et al. |
| 2013/0232932 A1 | 9/2013 | Jarrier |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette, II |
| 2013/0306322 A1 | 11/2013 | Sanborn et al. |
| 2013/0333567 A1 | 12/2013 | Kulkarni et al. |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0017068 A1 | 1/2014 | Herrera |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0060774 A1 | 3/2014 | Motakef et al. |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0102301 A1 | 4/2014 | Marks et al. |
| 2014/0123621 A1 | 5/2014 | Driessens et al. |
| 2014/0130422 A1 | 5/2014 | Laing et al. |
| 2014/0130468 A1 | 5/2014 | Jackson |
| 2014/0137524 A1 | 5/2014 | Jarrier |
| 2014/0138079 A1 | 5/2014 | Broussard et al. |
| 2014/0144641 A1 | 5/2014 | Chandler |
| 2014/0147291 A1 | 5/2014 | Burnette |
| 2014/0157778 A1 | 6/2014 | Ponnuraj et al. |
| 2014/0158345 A1 | 6/2014 | Jang et al. |
| 2014/0174097 A1 | 6/2014 | Hammer et al. |
| 2014/0196437 A1 | 7/2014 | Schneider |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251129 A1 | 9/2014 | Upadhyay et al. |
| 2014/0251143 A1 | 9/2014 | Hawkinson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2014/0360370 A1 | 12/2014 | Eyers et al. |
| 2015/0007720 A1 | 1/2015 | Vu et al. |
| 2015/0027730 A1 | 1/2015 | Hall et al. |
| 2015/0033698 A1 | 2/2015 | Cuevas et al. |
| 2015/0078924 A1 | 3/2015 | Zhang et al. |
| 2015/0082758 A1 | 3/2015 | Saraswathi et al. |
| 2015/0101344 A1 | 4/2015 | Jarrier et al. |
| 2015/0107199 A1 | 4/2015 | Smith et al. |
| 2015/0114229 A1 | 4/2015 | Rout et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0152785 A1 | 6/2015 | Saraswathi et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0240720 A1 | 8/2015 | Brunner |
| 2015/0252661 A1* | 9/2015 | Glass ................ E21B 43/2607 166/308.1 |
| 2015/0275891 A1 | 10/2015 | Chong |
| 2015/0322859 A1 | 11/2015 | Van Den Bossche et al. |
| 2015/0337730 A1 | 11/2015 | Kupiszewski et al. |
| 2015/0340864 A1* | 11/2015 | Compton ................ H02J 3/00 307/66 |
| 2015/0345385 A1 | 12/2015 | Santini |
| 2015/0369351 A1 | 12/2015 | Hermann et al. |
| 2016/0017861 A1 | 1/2016 | Sigurdsson |
| 2016/0032703 A1 | 2/2016 | Broussard et al. |
| 2016/0032836 A1 | 2/2016 | Hawkinson et al. |
| 2016/0059168 A1 | 3/2016 | Bataille et al. |
| 2016/0076447 A1 | 3/2016 | Merlo et al. |
| 2016/0096134 A1 | 4/2016 | Santini et al. |
| 2016/0097324 A1 | 4/2016 | Taylor et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |

(56) References Cited

U.S. PATENT DOCUMENTS

| | | |
|---|---|---|
| 2016/0177675 A1 | 6/2016 | Morris et al. |
| 2016/0177678 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0002739 A1 | 1/2017 | Ramirez et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0050135 A1 | 2/2017 | Aota et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladrón |
| 2017/0131174 A1 | 5/2017 | Enev et al. |
| 2017/0145918 A1 | 5/2017 | Oehring et al. |
| 2017/0182450 A1 | 6/2017 | Kitaguchi |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole et al. |
| 2017/0320004 A1 | 11/2017 | Allegorico et al. |
| 2017/0322086 A1 | 11/2017 | Luharuka et al. |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038216 A1 | 2/2018 | Zhang et al. |
| 2018/0038328 A1 | 2/2018 | Louven et al. |
| 2018/0041093 A1 | 2/2018 | Miranda |
| 2018/0045202 A1 | 2/2018 | Crom |
| 2018/0058171 A1 | 3/2018 | Roesner et al. |
| 2018/0080376 A1 | 3/2018 | Austin et al. |
| 2018/0080377 A1 | 3/2018 | Austin et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney et al. |
| 2018/0229998 A1 | 8/2018 | Shock |
| 2018/0258746 A1 | 9/2018 | Broussard et al. |
| 2018/0266412 A1 | 9/2018 | Stokkevåg et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1* | 11/2018 | Bishop .................. F04B 17/06 |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063326 A1 | 2/2019 | Davis |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckels et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0264667 A1 | 8/2019 | Byrne |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0322390 A1 | 10/2019 | Merrit et al. |

(56) References Cited

U.S. PATENT DOCUMENTS

| | | |
|---|---|---|
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0353303 A1 | 11/2019 | Morris et al. |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husøy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja et al. |
| 2020/0263498 A1 | 8/2020 | Fischer et al. |
| 2020/0263525 A1 | 8/2020 | Reid et al. |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309027 A1 | 10/2020 | Rytkönen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340322 A1 | 10/2020 | Sizemore et al. |
| 2020/0340340 A1 | 10/2020 | Oehring et al. |
| 2020/0340344 A1* | 10/2020 | Reckels ............... E21B 43/2607 |
| 2020/0340404 A1 | 10/2020 | Stockstill et al. |
| 2020/0347725 A1 | 11/2020 | Morris et al. |
| 2020/0354928 A1 | 11/2020 | Wehler et al. |
| 2020/0355055 A1 | 11/2020 | Dusterhoft et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0386169 A1 | 12/2020 | Hinderliter et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson, Jr. |
| 2021/0071752 A1 | 3/2021 | Cui et al. |
| 2021/0079758 A1 | 3/2021 | Yeung et al. |
| 2021/0079841 A1 | 3/2021 | Yeung et al. |
| 2021/0079849 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0231053 A1 | 7/2021 | Mohr et al. |
| 2021/0231119 A1 | 7/2021 | Boguski et al. |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0301815 A1 | 9/2021 | Chreitien et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372326 A1 | 12/2021 | Yeung et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0082051 A1 | 3/2022 | Merchant et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0127944 A1 | 4/2022 | Chapman et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |

(56) References Cited

U.S. PATENT DOCUMENTS

| | | |
|---|---|---|
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao et al. |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0086680 A1 | 3/2023 | Yeung et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0108653 A1 | 4/2023 | Jupudi et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0141133 A1 | 5/2023 | Yeung et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |
| 2023/0182063 A1 | 6/2023 | Lennhager et al. |
| 2023/0191296 A1 | 6/2023 | Kirby et al. |
| 2023/0212933 A1 | 7/2023 | Zhang et al. |
| 2023/0219029 A1 | 7/2023 | Tiffany et al. |
| 2023/0296050 A1 | 9/2023 | Yeung et al. |
| 2023/0332598 A1 | 10/2023 | Zhang et al. |
| 2023/0349279 A1 | 11/2023 | Zhang et al. |
| 2024/0117765 A1 | 4/2024 | Yeung et al. |
| 2024/0301777 A1 | 9/2024 | Zhang et al. |
| 2025/0059913 A1 | 2/2025 | Merchant et al. |
| 2025/0059914 A1 | 2/2025 | Merchant et al. |

FOREIGN PATENT DOCUMENTS

| | | |
|---|---|---|
| CA | 2043184 C | 8/1994 |
| CA | 2829762 A1 | 9/2012 |
| CA | 2737321 C | 9/2013 |
| CA | 2876687 A1 | 5/2014 |
| CA | 2693567 C | 9/2014 |
| CA | 2964597 A1 | 10/2017 |
| CA | 2876687 C | 4/2019 |
| CA | 2964597 C | 10/2020 |
| CA | 3138533 A1 | 11/2020 |
| CA | 2919175 C | 3/2021 |
| CN | 2622404 Y | 6/2004 |
| CN | 2779054 Y | 5/2006 |
| CN | 2890325 Y | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 A | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 A | 9/2011 |
| CN | 202000930 U | 10/2011 |
| CN | 202055781 U | 11/2011 |

(56) References Cited

FOREIGN PATENT DOCUMENTS

| | | |
|---|---|---|
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 B | 7/2012 |
| CN | 102562020 A | 7/2012 |
| CN | 102602323 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 U | 1/2014 |
| CN | 203420697 U | 2/2014 |
| CN | 203480755 U | 3/2014 |
| CN | 103711437 A | 4/2014 |
| CN | 103764252 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 103790927 A | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |

(56) References Cited

FOREIGN PATENT DOCUMENTS

| | | | |
|---|---|---|---|
| CN | 104314512 | A | 1/2015 |
| CN | 204077478 | U | 1/2015 |
| CN | 204077526 | U | 1/2015 |
| CN | 204078307 | U | 1/2015 |
| CN | 204083051 | U | 1/2015 |
| CN | 204113168 | U | 1/2015 |
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | B | 12/2015 |
| CN | 105207097 | A | 12/2015 |
| CN | 204831952 | U | 12/2015 |
| CN | 204899777 | U | 12/2015 |
| CN | 102602323 | B | 1/2016 |
| CN | 105240064 | A | 1/2016 |
| CN | 204944834 | U | 1/2016 |
| CN | 205042127 | U | 2/2016 |
| CN | 205172478 | U | 4/2016 |
| CN | 103993869 | B | 5/2016 |
| CN | 105536299 | A | 5/2016 |
| CN | 105545207 | A | 5/2016 |
| CN | 205260249 | U | 5/2016 |
| CN | 103233714 | B | 6/2016 |
| CN | 104340682 | B | 6/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 103277290 | B | 8/2016 |
| CN | 104260672 | B | 8/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | U | 9/2016 |
| CN | 106121577 | A | 11/2016 |
| CN | 205709587 | U | 11/2016 |
| CN | 104612928 | B | 12/2016 |
| CN | 106246120 | A | 12/2016 |
| CN | 205805471 | U | 12/2016 |
| CN | 106321045 | A | 1/2017 |
| CN | 205858306 | U | 1/2017 |
| CN | 106438310 | A | 2/2017 |
| CN | 205937833 | U | 2/2017 |
| CN | 104563994 | B | 3/2017 |
| CN | 206129196 | U | 4/2017 |
| CN | 104369687 | B | 5/2017 |
| CN | 106715165 | A | 5/2017 |
| CN | 106761561 | A | 5/2017 |
| CN | 104820372 | B | 6/2017 |
| CN | 105240064 | B | 6/2017 |
| CN | 206237147 | U | 6/2017 |
| CN | 206287832 | U | 6/2017 |
| CN | 206346711 | U | 7/2017 |
| CN | 104563995 | B | 9/2017 |
| CN | 107120822 | A | 9/2017 |
| CN | 107143298 | A | 9/2017 |
| CN | 107159046 | A | 9/2017 |
| CN | 107188018 | A | 9/2017 |
| CN | 206496016 | U | 9/2017 |
| CN | 104564033 | B | 10/2017 |
| CN | 107234358 | A | 10/2017 |
| CN | 107261975 | A | 10/2017 |
| CN | 206581929 | U | 10/2017 |
| CN | 105092401 | B | 12/2017 |
| CN | 107476769 | A | 12/2017 |
| CN | 107520526 | A | 12/2017 |
| CN | 206754664 | U | 12/2017 |
| CN | 107605427 | A | 1/2018 |
| CN | 106438310 | B | 2/2018 |
| CN | 107654196 | A | 2/2018 |
| CN | 107656499 | A | 2/2018 |
| CN | 107728657 | A | 2/2018 |
| CN | 206985503 | U | 2/2018 |
| CN | 207017968 | U | 2/2018 |
| CN | 107849130 | A | 3/2018 |
| CN | 107859053 | A | 3/2018 |
| CN | 207057867 | U | 3/2018 |
| CN | 207085817 | U | 3/2018 |
| CN | 105545207 | B | 4/2018 |
| CN | 107883091 | A | 4/2018 |
| CN | 107902427 | A | 4/2018 |
| CN | 107939290 | A | 4/2018 |
| CN | 107956708 | A | 4/2018 |
| CN | 207169595 | U | 4/2018 |
| CN | 207194873 | U | 4/2018 |
| CN | 207245674 | U | 4/2018 |
| CN | 108034466 | A | 5/2018 |
| CN | 108036071 | A | 5/2018 |
| CN | 108087050 | A | 5/2018 |
| CN | 207380566 | U | 5/2018 |
| CN | 108103483 | A | 6/2018 |
| CN | 108179046 | A | 6/2018 |
| CN | 108254276 | A | 7/2018 |
| CN | 108311535 | A | 7/2018 |
| CN | 207583576 | U | 7/2018 |
| CN | 207634064 | U | 7/2018 |

(56) References Cited

FOREIGN PATENT DOCUMENTS

| | | | |
|---|---|---|---|
| CN | 207648054 U | 7/2018 |
| CN | 207650621 U | 7/2018 |
| CN | 207654664 U | 7/2018 |
| CN | 108371894 A | 8/2018 |
| CN | 207777153 U | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 U | 9/2018 |
| CN | 207814698 U | 9/2018 |
| CN | 207862275 U | 9/2018 |
| CN | 108687954 A | 10/2018 |
| CN | 207935270 U | 10/2018 |
| CN | 207961582 U | 10/2018 |
| CN | 207964530 U | 10/2018 |
| CN | 108789848 A | 11/2018 |
| CN | 108799473 A | 11/2018 |
| CN | 108868675 A | 11/2018 |
| CN | 208086829 U | 11/2018 |
| CN | 208089263 U | 11/2018 |
| CN | 208169068 U | 11/2018 |
| CN | 108979569 A | 12/2018 |
| CN | 109027662 A | 12/2018 |
| CN | 109058092 A | 12/2018 |
| CN | 208179454 U | 12/2018 |
| CN | 208179502 U | 12/2018 |
| CN | 208253147 U | 12/2018 |
| CN | 208260574 U | 12/2018 |
| CN | 109114418 A | 1/2019 |
| CN | 109141990 A | 1/2019 |
| CN | 208313120 U | 1/2019 |
| CN | 208330319 U | 1/2019 |
| CN | 208342730 U | 1/2019 |
| CN | 208430982 U | 1/2019 |
| CN | 208430986 U | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 U | 3/2019 |
| CN | 208564516 U | 3/2019 |
| CN | 208564525 U | 3/2019 |
| CN | 208564918 U | 3/2019 |
| CN | 208576026 U | 3/2019 |
| CN | 208576042 U | 3/2019 |
| CN | 208650818 U | 3/2019 |
| CN | 208669244 U | 3/2019 |
| CN | 109555484 A | 4/2019 |
| CN | 109682881 A | 4/2019 |
| CN | 208730959 U | 4/2019 |
| CN | 208735264 U | 4/2019 |
| CN | 208746733 U | 4/2019 |
| CN | 208749529 U | 4/2019 |
| CN | 208750405 U | 4/2019 |
| CN | 208764658 U | 4/2019 |
| CN | 109736740 A | 5/2019 |
| CN | 109751007 A | 5/2019 |
| CN | 208868428 U | 5/2019 |
| CN | 208870761 U | 5/2019 |
| CN | 109869294 A | 6/2019 |
| CN | 109882144 A | 6/2019 |
| CN | 109882372 A | 6/2019 |
| CN | 209012047 U | 6/2019 |
| CN | 209100025 U | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 U | 9/2019 |
| CN | 110374745 A | 10/2019 |
| CN | 209534736 U | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 U | 11/2019 |
| CN | 209653968 U | 11/2019 |
| CN | 209654004 U | 11/2019 |
| CN | 209654022 U | 11/2019 |
| CN | 209654128 U | 11/2019 |
| CN | 209656622 U | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 U | 12/2019 |
| CN | 209780827 U | 12/2019 |
| CN | 209798631 U | 12/2019 |
| CN | 209799942 U | 12/2019 |
| CN | 209800178 U | 12/2019 |
| CN | 209855723 U | 12/2019 |
| CN | 209855742 U | 12/2019 |
| CN | 209875063 U | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 U | 2/2020 |
| CN | 210049882 U | 2/2020 |
| CN | 210097596 U | 2/2020 |
| CN | 210105817 U | 2/2020 |
| CN | 210105818 U | 2/2020 |
| CN | 210105993 U | 2/2020 |
| CN | 110873093 A | 3/2020 |
| CN | 210139911 U | 3/2020 |
| CN | 110947681 A | 4/2020 |
| CN | 111058810 A | 4/2020 |
| CN | 111075391 A | 4/2020 |
| CN | 210289931 U | 4/2020 |
| CN | 210289932 U | 4/2020 |
| CN | 210289933 U | 4/2020 |
| CN | 210303516 U | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |

(56) References Cited

FOREIGN PATENT DOCUMENTS

| | | |
|---|---|---|
| CN | 111206994 A | 5/2020 |
| CN | 210449044 U | 5/2020 |
| CN | 210460875 U | 5/2020 |
| CN | 210522432 U | 5/2020 |
| CN | 210598943 U | 5/2020 |
| CN | 210598945 U | 5/2020 |
| CN | 210598946 U | 5/2020 |
| CN | 210599194 U | 5/2020 |
| CN | 210599303 U | 5/2020 |
| CN | 210600110 U | 5/2020 |
| CN | 111219326 A | 6/2020 |
| CN | 111350595 A | 6/2020 |
| CN | 210660319 U | 6/2020 |
| CN | 210714569 U | 6/2020 |
| CN | 210769168 U | 6/2020 |
| CN | 210769169 U | 6/2020 |
| CN | 210769170 U | 6/2020 |
| CN | 210770133 U | 6/2020 |
| CN | 210825844 U | 6/2020 |
| CN | 210888904 U | 6/2020 |
| CN | 210888905 U | 6/2020 |
| CN | 210889242 U | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 U | 8/2020 |
| CN | 211201920 U | 8/2020 |
| CN | 211202218 U | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 U | 9/2020 |
| CN | 211397553 U | 9/2020 |
| CN | 211397677 U | 9/2020 |
| CN | 211412945 U | 9/2020 |
| CN | 211500955 U | 9/2020 |
| CN | 211524765 U | 9/2020 |
| DE | 4004854 A1 | 8/1991 |
| DE | 4241614 A1 | 6/1994 |
| DE | 102009022859 A1 | 12/2010 |
| DE | 102012018825 A1 | 3/2014 |
| DE | 102013114335 A1 | 11/2014 |
| DE | 102013111655 A1 | 12/2014 |
| DE | 102015103872 A1 | 10/2015 |
| DE | 102013114335 B4 | 12/2020 |
| EP | 0835983 A2 | 4/1998 |
| EP | 1378683 A2 | 1/2004 |
| EP | 1378683 A3 | 8/2004 |
| EP | 2143916 A1 | 1/2010 |
| EP | 2613023 A2 | 7/2013 |
| EP | 3049642 A1 | 8/2016 |
| EP | 3095989 A1 | 11/2016 |
| EP | 3211766 A1 | 8/2017 |
| EP | 3049642 B1 | 4/2018 |
| EP | 3354866 A1 | 8/2018 |
| EP | 3075946 B1 | 5/2019 |
| FR | 2795774 A1 | 1/2001 |
| GB | 474072 A | 10/1937 |
| GB | 1438172 A | 6/1976 |
| JP | S57135212 A | 8/1982 |
| KR | 20020026398 A | 4/2002 |
| KR | 20170134281 A | 12/2017 |
| RU | 13562 U1 | 4/2000 |
| WO | WO-9320328 A1 | 10/1993 |
| WO | WO-2006025886 A2 | 3/2006 |
| WO | WO-2009023042 A1 | 2/2009 |
| WO | WO-2011133821 A2 | 10/2011 |
| WO | WO-2012139380 A1 | 10/2012 |
| WO | WO-2013158822 A1 | 10/2013 |
| WO | WO-2013163786 A1 | 11/2013 |
| WO | WO-2013185399 A1 | 12/2013 |
| WO | WO-2015158020 A1 | 10/2015 |
| WO | WO-2016014476 A1 | 1/2016 |
| WO | WO-2016033983 A1 | 3/2016 |
| WO | WO-2016078181 A1 | 5/2016 |
| WO | WO-2016101374 A1 | 6/2016 |
| WO | WO-2016112590 A1 | 7/2016 |
| WO | WO-2016130450 A1 | 8/2016 |
| WO | WO-2016186790 A1 | 11/2016 |
| WO | WO-2017123656 A2 | 7/2017 |
| WO | WO-2017146279 A1 | 8/2017 |
| WO | WO-2017123656 A3 | 10/2017 |
| WO | WO-2017213848 A1 | 12/2017 |
| WO | WO-2018031029 A1 | 2/2018 |
| WO | WO-2018031031 A1 | 2/2018 |
| WO | WO-2018031029 A8 | 3/2018 |
| WO | WO-2018038710 A1 | 3/2018 |
| WO | WO-2018044293 A1 | 3/2018 |
| WO | WO-2018044307 A1 | 3/2018 |
| WO | WO-2018071738 A1 | 4/2018 |
| WO | WO-2018075034 A1 | 4/2018 |
| WO | WO-2018075034 A8 | 5/2018 |
| WO | WO-2018101909 A1 | 6/2018 |
| WO | WO-2018101912 A1 | 6/2018 |
| WO | WO-2018106210 A1 | 6/2018 |
| WO | WO-2018106225 A1 | 6/2018 |
| WO | WO-2018106252 A1 | 6/2018 |
| WO | WO-2018132106 A1 | 7/2018 |
| WO | WO-2018156131 A1 | 8/2018 |
| WO | WO-2018187346 A1 | 10/2018 |
| WO | WO-2019045691 A1 | 3/2019 |
| WO | WO-2019046680 A1 | 3/2019 |
| WO | WO-2019060922 A1 | 3/2019 |
| WO | WO-2019117862 A1 | 6/2019 |
| WO | WO-2019126742 A1 | 6/2019 |
| WO | WO-2019147601 A1 | 8/2019 |
| WO | WO-2019169366 A1 | 9/2019 |
| WO | WO-2019195651 A1 | 10/2019 |
| WO | WO-2019200510 A1 | 10/2019 |
| WO | WO-2019210417 A1 | 11/2019 |
| WO | WO-2020018068 A1 | 1/2020 |
| WO | WO-2020046866 A1 | 3/2020 |
| WO | WO-2020072076 A1 | 4/2020 |
| WO | WO-2020076569 A1 | 4/2020 |
| WO | WO-2020097060 A2 | 5/2020 |
| WO | WO-2020104088 A1 | 5/2020 |
| WO | WO-2020131085 A1 | 6/2020 |
| WO | WO-2020211083 A1 | 10/2020 |
| WO | WO-2020211086 A1 | 10/2020 |
| WO | WO-2021038604 A1 | 3/2021 |
| WO | WO-2021041783 A1 | 3/2021 |

OTHER PUBLICATIONS

AFD Petroleum Ltd: "Automated Hot Zone Frac Refueling System," Dec. 2018, 2 Pages.

Afglobal Corporation: "Durastim Hydraulic Fracturing Pump," A Revolutionary Design for Continuous Duty Hydraulic Fracturing, 2018, 4 Pages.

Ahmadzadehtalatapeh M., et al., Performance Enhancement of Gas Turbine Units by Retrofitting With Inlet Air Cooling Technologies (IACTs): An Hour-by-Hour Simulation Study, Journal of the Brazilian Society of Mechanical Sciences and Engineering, Mar. 2020, 29 Pages.

Akita E., et al., "Mewbourne College of Earth & Energy," Society of Petroleum Engineers, Drilling Systems Automation Technical Section (DSATS), 2019, 105 Pages.

American Petroleum Institute: "Gas Turbines for the Petroleum, Chemical, and Gas Industry Services," API Standard 616, Fifth Edition, API Publishing Services, Washington, DC, Jan. 2011, 177 Pages.

American Petroleum Institute: "Positive Displacement Pumps-Reciprocating," API Standard 674, Third Edition, API Publishing Services, Washington, D.C, Dec. 2010, 104 Pages.

(56) References Cited

OTHER PUBLICATIONS

API: "2011 Publications Programs and Services," American Petroleum Institute, 2011, 140 Pages.
API: "2011 Publications Programs and Services," American Petroleum Institute, 2011, 260 Pages.
API: "About API," American Petroleum Institute, 8 Pages, Retrieved on [Dec. 30, 2021] Retrieved from URL: https://www.api.org/about.
"API's Global Industry Services," American Petroleum Institute, Copyright Aug. 2020, 2 Pages.
API Standard 671: "Special-Purpose Couplings for Petroleum, Chemical, and Gas Industry Services," 4th Edition, Sep. 2010, 64 Pages, (Aug. 2007).
Arop J.B., "Geomechanical Review of Hydraulic Fracturing Technology," Thesis (M. Eng) Massachusetts Institute of Technology, Department of Civil and Environmental Engineering, Cambridge, MA, Oct. 29, 2013, 291 Pages, Retrieved from URL: https://dspace.mit.edu/handle/1721.1/82176.
Atlas: "On-Site Fuel Services and Mobile Fuel Delivery," atlasoil.com, Mar. 6, 2019, 3 Pages, Retrieved from URL: https://www.atlasoil.com/nationwide-fueling/onsite-and-mobile-fueling.
Beer F.P., et al., "Mechanics of Materials," 6th Edition, McGraw Hill, 2012, 838 Pages.
Boman K., "Turbine Technology Powers Green Field Multi-Fuel Frack Pump," Rigzone, Mar. 7, 2015, 5 Pages, [Retrieved on Mar. 14, 2015] Retrieved from URL: https://web.archive.org/web/20150314203227/https://www.rigzone.com/news/oil-gas/a/124883/Turbine_Technology_Powers_Green_Field_MultiFuel_Frack_Pump.
Cabling: "Business Week: Fiber-Optic Cables Help Fracking," Cablinginstall.com, Jul. 12, 2013, 10 Pages, Retrieved from URL: https://www.cablinginstall.com/cable/article/16474208/businessweek-fiberoptic-cables-help-fracking.
Cameron Schlumberger Company: "Frac Manifold Systems," 2016, 16 Pages.
Candyne Pump Services Inc: "Q700 Pump," Weatherford, Calgary, Alberta, Canada, Aug. 15, 2015, 2 Pages, Retrieved from URL: http://candyne.com/wp-content/uploads/2014/10/181905-94921.q700-quintuplex-pump.pdf.
Capstone Turbine Corporation: "Capstone Receives Three Megawatt Order from Large Independent Oil & Gas Company in Eagle Ford Shale Play," Dec. 7, 2010, 2 Pages.
Chaichan M.T., "The Impact of Equivalence Ratio on Performance and Emissions of a Hydrogen-diesel Dual Fuel Engine With Cooled Exhaust Gas Recirculation," International Journal of Scientific & Engineering Research, Jun. 2015, vol. 6, No. 6, pp. 938-941, 9 Pages.
CNG Delivery: "Fracturing With Natural Gas, Dual-Fuel Drilling With CNG," Aug. 22, 2019, 7 Pages.
Cooper B., et al., "Jet Frac Porta-Skid—A New Concept in Oil Field Service Pump Equipment," Society of Petroleum Engineers of AIME, SPE-2706, Sep. 28-Oct. 1, 1969, 10 Pages.
De Gevigney J.D., et al., "Analysis of No-Load Dependent Power Losses in a Planetary Gear Train by Using Thermal Network Method," International Gear Conference 2014, Lyon, Aug. 26-28, 2014, pp. 615-624.
Dowell: "B908 Turbine Pumper," Operator's Manual, 9 Pages.
Dziubak T., "Experimental Studies of Dust Suction Irregularity from Multi-Cyclone Dust Collector of Two-Stage Air Filter," Energies., Jun. 16, 2021, vol. 14, No. 3577, 28 Pages.
Eberhard M., "Fracture Design and Stimulation: Monitoring Well Construction & Operations technical workshop In support of the EPA Hydraulic Fracturing Study," Halliburton, Mar. 10-11, 2011, 24 Pages.
Ecob D.J., et al., "Design and Development of a Landfill Gas Combustion System for the Typhoon Gas Turbine," ASME 1996 International Gas Turbine and Aeroengine Congress and Exhibition, American Society of Mechanical Engineers Digital Collection, Jun. 10-13, 1996, 8 Pages.

empengineering.com: "Hemp Resistant Electrical Generators / Hardened Structures HEMP/GMD Shielded Generators," Virginia, Nov. 3, 2012, 6 Pages.
energy.gov: "The Water-Energy Nexus: Challenges and Opportunities," Department of Energy, United States of America, Jun. 2014, 262 Pages, purenergypolicy.org.
Europump and Hydrualic Institute: "Variable Speed Pumping: A Guide to Successful Applications," Elsevier Ltd, 2004, 186 Pages.
Eygun C., et al., "Mitigating Shale Gas Developments Carbon Footprint: Evaluating and Implementing Solutions in Argentina," URTeC: 2687987, Copyright 2017, Unconventional Resources Technology Conference held in Austin, Texas, USA, Jul. 24-26, 2017, 14 Pages.
Filipovic I., et al., "Preliminary Selection of Basic Parameters of Different Torsional Vibration Dampers Intended for use in Medium-Speed Diesel Engines," Transactions of Famena XXXVI-3, 2012, 10 Pages.
Final Written decision of PGR2021-00102, dated Feb. 6, 2023, 43 Pages.
Final written decision of PGR2021-00103, dated Feb. 6, 2023, 40 Pages.
FMC Technologies: "Operation and Maintenance Manual, L06 Through L16 Triplex Pumps," Doc No. OMM50000903 Rev: E, Aug. 27, 2009, 66 Pages.
Frac Shack: "Bi-Fuel FracFueller," Brochure, 2011, 2 Pages.
FTS International: FTS International's Dual Fuel Hydraulic Fracturing Equipment Increases Operational Efficiencies, Provides Cost Benefits, Jan. 3, 2018, 3 Pages.
Gardner Denver: "GD-3000 Well Service Pump," Gardner Denver Hydraulic Fracturing Pumps, 2 Pages, Retrieved from URL: https://www.gardnerdenver.comien-usipumpsitriplex-fracking-pump-gd-3000.
Ginter T., et al., "Uprate Options for the MS6001 Heavy Duty Gas Turbine," GE paper GER-3808C, GE Energy 12, 2006, 64 Pages.
Gladstein: "High Horsepower HHP Summit 2012," Review of HHP Summit 2012, Gladstein, Neandross & Associates, Sep. 26-28, 2012, 4 Pages, Retrieved from URL: https://www.gladstein.origgna-conferences/high-horsepower-summit-2012/.
Green Field Energy Services: "Green Field Energy Services Deploys Third New Hydraulic Fracturing Spread," Jul. 11, 2012, 3 Pages, Retrieved from URL: https://www.prnewswire.cominews-releases/green-field-energy-services-deploys-third-new-hydraulic-facturing-spread-162113425.
Green Field Energy Services: "Green Field Energy Services Natural Gas Driven Turbine Frac Pumps," HHP Summit Presentation, Yumpu, Sep. 2012, 15 Pages, (Green Field), Retrieved from URL: https://www.yumpu.com/en/document/read/49685291/turbine-frac-pump-assembly-hhp.
Halliburton: "Vessel-Based Modular Solution," Production Enhancement, 2015, 4 Pages.
Hausfeld T., et al., "TM2500+ Power for Hydraulic Fracturing," Evolution Well Services, GE Imagination at Work, 2013, 20 Pages.
HCI Jet Frac, Screenshots from YouTube, Dec. 11, 2010. https://www.youtube.com/watch?v=6HjXkdbFaFQ.
HHP Summit 2012: "Natural Gas for High Horsepower Applications," High Horsepower Summit Agenda, Sep. 5, 2012, 8 Pages.
Hydrocarbons Technology: "Mee Industries: Inlet Air Fogging Systems for Oil, Gas and Petrochemical Processing," Verdict Media Limited, Copyright 2020, 2 Pages.
Ibragimov E.S., "Use of Gas-Turbine Engines in Oil Field Pumping Units," Chemical and Petroleum Engineering, 1994, vol. 30, pp. 530-532, (Translated from Khimicheskaya i Neftyanoe Mashinostroenie, Nov. 1994, No. 11, pp. 24-26).
Ide N., "The Right Valve for Controlling Flow Direction? Check.," Swagelok, Oct. 27, 2016, 7 Pages.
IHS Markit Standards Store: "Positive Displacement Pumps Reciprocating," API STD 674, 3rd Edition, Dec. 2010, [Retrieved on Dec. 30, 2021] Retrieved from URL: https://global.ihs.com/doc_detail.cfm?document_name=API%20STD%20674&item_s_key=00010672#doc-detail-history-anchor and "Special Purpose Coupling for Petroleum, Chemical, and Gas Industry Services," API STD 671, 4th Edition, Aug. 2007, 6 Pages, [Retrieved on Dec. 30, 2021] Retrieved from URL: https://global.ihs.com/doc_detail.cfm?

(56) References Cited

OTHER PUBLICATIONS

&input_doc_number=671&input_doc_title=&document_name=API%20STD%20671&item_s_key=00010669&item_key_date=890331&origin=DSSC.
II-VI Marlow Blog: "Thermoelectric Technologies in Oil, Gas, and Mining Industries," II-VI Marlow Industries, Jul. 24, 2019, 7 Pages, (blog.marlow.com).
Integrated Flow: "Modular Process Skid Manufacturers," Jul. 15, 2017, 6 Pages, Retrieved from URL: https://ifsolutions.com/why-modular/.
ISM: "What is Cracking Pressure," Jun. 4, 2019, 9 Pages.
JBG Enterprises Inc: "WS-Series Blowout Prevention Safety Coupling-Quick Release Couplings," Sep. 11, 2015, 8 Pages, Retrieved from URL: http://www.jgbhose.com/products/WS-Series-Blowout-Prevention-Safety-Coupling.asp.
Jereh Group: "35% Economy Increase, Dual-fuel System Highlighting Jereh Apollo Frac Pumper," Apr. 13, 2015, 2 Pages, Retrieved from URL: https://www.jereh.com/en/news/press-release/news-detail-7345.html.
Jereh Group: "Jereh Apollo 4500 Turbine Frac Pumper Finishes Successful Field Operation in China," Feb. 13, 2015, 2 Pages, [Retrieved on Apr. 20, 2015] Retrieved from URL: https://web.archive.org/web/20150420220625/https://www.prnewswire.com/news-releases/jereh-apollo-4500-turbine-frac-pumper-finishes-successful-field-operation-in-china-300035829.html.
Jereh Group: "Jereh Apollo Turbine Fracturing Pumper Featured on China Central Television," Mar. 9, 2018, 2 Pages, Retrieved from URL: https://www.jereh.com/en/news/press-release/news-detail-7267.html.
Jereh Group: "Jereh Unveiled New Electric Fracturing Solution at OTC 2019," May 7, 2019, 3 Pages, [Retrieved on May 28, 2019] Retrieved from URL: https://web.archive.org/web/20190528183906/https://www.prnewswire.com/news-releases/jereh-unveiled-new-electric-fracturing-solution-at-otc-2019-300845028.html.
Jereh Oilfield Services Group: "Jereh Debut's Super Power Turbine Fracturing Pump, Leading the Industrial Revolution," Jereh Oilfield Services Group, Mar. 19, 2014, 3 Pages, Retrieved from URL: https://www.prnewswire.com/news-releases/jereh-debuts-super-power-turbine-fracturing-pump-leading-the-industrial-revolution-250992111.html.
Karassik I.J., et al., "Pump Handbook," 4th Edition, McGraw-Hill Education, New York, 2008, 431 Pages.
Kas'yanov A.D., et al., "Application of Gas-turbine Engines in Pumping Units Complexes of Hydraulic Fracturing of Oil and Gas Reservoirs," Exposition Oil & Gas, Oct. 24, 2012, 3 Pages, (Published in Russian).
Lekontsev Y.M., et al., "Two-Side Sealer Operation," Journal of Mining Science, 2013, vol. 49, No. 5, pp. 757-762.
Lord Sensing: "Advances in Popular Torque-Link Solution Offer OEMs Greater Benefit," Jun. 21, 2018, 1 Page.
Mahlalela B.M., et al., "Electric Power Generation Potential Based on Waste Heat and Geothermal Resources in South Africa," Proceedings 44th Workshop on Geothermal Reservoir Engineering, pangea.Stanford.edu, Feb. 11-13, 2019, 13 Pages.
Mancuso J., "General Purpose vs Special Purpose Couplings," Proceedings of the Twenty-Third TurboMachinery Symposium, 1994, 12 Pages.
Mancuso J.R et al., "The Application of Flexible Couplings for Turbomachinery," Proceedings of the Eighteenth Turbomachinery Symposium, 1989, 24 Pages.
Marine Turbine Technologies, 1 MW Power Generation Package, http://marineturbine.com/power-generation, 2017.
Marine Turbine Technologies: "Turbine Powered Frac Units," Marine Turbine, Franklin, Louisiana, 2020, 15 Pages.
Minovski B., "Coupled Simulations of Cooling and Engine Systems for Unsteady Analysis of the Benefits of Thermal Engine Encapsulation," Department of Applied Mechanics, Chalmers University of Technology, Goteborg, Sweden, 2015, 47 Pages.
Moliere M., et al., "Heavy Duty Gas Turbines in Petrochemical Plants: Samsung's Daesan Plant (Korea) Beats Fuel Flexibility Records With Over 95% Hydrogen in Process Gas," Proceedings of PowerGen Asia Conference, Singapore, Sep. 1999, 7 Pages.
Mutua D.C., et al., "Fracking Companies Switch to Electric Motors to Power Pumps," iadd-intl.org, International Association of Diecutting and Diemaking in Houston, Texas, USA, Jun. 27, 2019, 5 Pages, Retrieved from URL: https://www.iadd-intl.org/articlesffracking-companies-switch-to-electric-motors-to-power-pumps/.
Neal J.C., (Gulf Oil Corp Odessa Texas)., "Gas Turbine Driven Centrifugal Pumps for High Pressure Water Injection," American Institute of Mining, Metallurgical and Petroleum Engineers, Inc, SPE-1888-MS, 1967, 2 Pages.
nooutage.com LLC: "PowerShelter Kit II," Sep. 6, 2019, 4 Pages.
"Overview of Industry Guidance/Best Practices on Hydraulic Fracturing (HF)," American Petroleum Institute, 2012, 3 Pages.
PBNG: "Natural Gas Fuel for Drilling and Hydraulic Fracturing," Diesel Displacement / Dual Fuel & Bi-Fuel, May 2014, 8 Pages.
Pettigrew D., et al., "High Pressure Multi-Stage Centrifugal Pump for 10,000 psi Frac Pump-HPHPS Frac Pump," Society of Petroleum Engineers, SPE 166191, Copyright 2013, SPE Annual Technical Conference and Exhibition held in New Orleans, Louisiana, USA, Sep. 30-Oct. 2, 2013, 8 Pages.
Porteiro J., et al., "Feasibility of a New Domestic CHP Trigeneration With Heat Pump: II. Availability Analysis," Design and Development, Applied Thermal Engineering, 2004, vol. 24, pp. 1421-1429.
Porter J.A., (Solar Division International Harvester Co.)., "Modern Industrial Gas Turbines for the Oil Field," American Petroleum Institute, Drilling and Production Practice, Solar Division International Harvester Co, API-67-243, Jan. 1, 1967, 2 Pages.
"Procedures for Standards Development," American Petroleum Institute, Third Edition, May 2006, 24 Pages, (Sep. 2006).
Researchgate: "Answer by Byron Woolridge," AES Deepwater Inc, Jan. 1, 2013, 1 Page, Retrieved from URL: https://www.researchgate.net/post/How_can_we_improve_the_efficiency_ofthe_gas_turbine_cycles.
Rigmaster Machinery Ltd: "Model: 2000 RMP-6-PLEX," Brochure, 5 Pages, Retrieved from URL: https://www.rigmastermachinery.com/_files/ugd/431e62_eaecd77c9fe54af8b13d08396072da67.pdf.
Rotating Right: "Quintuplex Power Pump Model Q700," Weatherford International Ltd, Edmonton, Alberta, Canada, 2021, 2 Pages, Retrieved from URL: https://www.rotatingrightcom/pdf/weatherford/RR%2026-Weatherford%20Model%20Q700.
Scott K., "Honghua Developing New-Generation Shale-Drilling Rig, Plans Testing of Frac Pump," Drilling Contractor, May 23, 2013, 4 Pages, Retrieved from URL: https://www.drillingcontractor.org/honghua-developing-new-generation-shale-drilling-rig-plans-testing-of-frac-pump-23278.
Seybold E., et al., "Evolution of Dual Fuel Pressure Pumping for Fracturing: Methods, Economics, Field Trial Results and Improvements in Availability of Fuel," Society of Petroleum Engineers, SPE 166443, Copyright 2013, SPE Annual Technical Conference and Exhibition held in New Orleans, Louisiana, USA, Sep. 30-Oct. 2, 2013, 18 Pages.
Shandong Saigao Group Corporation: "Q400 (5W115) Quintuplex Plunger Pump," Jinan City, Shandong Province, China, Saigao, Oct. 20, 2014, 11 Pages, Retrieved from URL: https://www.saigaogroup.com/product/q400-5w115-quintuplex-plunger-pump.html.
Sun Coast Resources: "The Leader in Frac Fueling," Fueling Services, Jun. 29, 2015, 4 Pages, Retrieved from URL: https://web.archive.org/web/20150629220609/https://www.suncoastresources.comioilfield/fueling-services/.
technology.org: "Check Valves: How Do they Work and What are the Main Types?," Dec. 6, 2018, 10 Pages.
The Wayback Machine: "About API," WaybackMachine Capture, Captured Apr. 22, 2011, 2 Pages, Retrieved from URL: https://web.archive.org/web/20110422104346//http://api.org/aboutapi/.
The Wayback Machine: "Publications," American Petroleum Institute, WaybackMachine Capture, Captured Apr. 27, 2011, 2 Pages, Retrieved from URL: https://web.archive.org/web/20110427043936 http://www.api.org:80/Publications/.
The Wayback Machine: "Standards," American Petroleum Institute, WaybackMachine Capture, 2 Pages, Captured Feb. 7, 2011, Retrieved from URL: https://web.archive.org/web/20110207195046/ http:/

(56) References Cited

OTHER PUBLICATIONS wwww.api.org/Standards/ and Captured Feb. 4, 2011, Retrieved from URL: https://web.archive.org/web/20110204112554/http://global.ihs.com/?RID=API1.

The Weir Group Inc: "Weir SPM Pump Product Catalog," S.P.M. Flow Control Inc, Fort Worth, Texas, Oct. 30, 2017, 40 Pages, Retrieved from URL: https://manage.global.weiriassets/files/product%20brochures/SPM_2P140706_Pump_Product_Catalogue_View.pdf.

Tiwari A., "Design of a Cooling System for a Hydraulic Fracturing Equipment," The Pennsylvania State University, The Graduate School, College of Engineering, Aug. 2015, 96 Pages.

Tory K., "Pump Control With Variable Frequency Drives," Pumps & Systems: Advances in Motors and Drives, Reprint from Jun. 2008, 4 Pages.

Turk L., "Green Field Asset Sale Called 'Largest Disposition Industry Has Seen'," The INDsider Media, Mar. 19, 2014, 3 Pages, Retrieved from URL: http://theind.com/article-16497-green-field-asset-sale-called-%E2%80%98largest-disposition-industry-has-seen%60.html.

Vericor: "Hydraulic Fracturing: Gas Turbine Proves Successful in Shale Gasfield Operations," 2017, 2 Pages, (Vericor Case Study), Retrieved from URL: https://www.vericor.com/wp-content/uploads/2020/02/7.-Fracing-4500hp-Pump-China-En.pdf.

Waizel B., "Oil, Gas Industry Discovers Innovative Solutions to Environmental Concerns," Hart Energy, Health, Safety & Environment, Dec. 10, 2018, 11 Pages.

Wallace E.M., et al., "Associated Shale Gas: From Flares to Rig Power," Society of Petroleum Engineers, SPE-173491-MS, Copyright 2015, SPE E&P Health, Safety, Security and Environmental Conference-Americas held in Denver, Colorado, USA, Mar. 16-18, 2015, 13 Pages.

Wang G., et al., "Dynamic Behavior of Reciprocating Plunger Pump Discharge Valve Based on Fluid Structure Interaction and Experimental Analysis," PLOS One, Oct. 21, 2015, vol. 10, No. 10, 20 Pages.

Wayback Machine: "API Member Companies," American Petroleum Institute, WaybackMachine Capture, 23 Pages, [Retrieved on Jan. 4, 2021] Retrieved from URL: https://web.archive.org/web/20130424080625/http://api.org/globalitems/globalheaderpages/membership/api-member-companies.

Weir Group: "Weir Oil & Gas Introduces Industry's First Continuous Duty 5000-Horsepower Pump," Jul. 25, 2019, 5 Pages, Retrieved from URL: https://www.global.weir/newsroom/news-articles/weir-oil-and-gas-introduces-industrys-first-continuous-duty-5000-horsepower-pump/.

Weir: "SPM QEM 5000 E-Frac Pump," Specification Sheet, Weir Group, Weir 5000, 2019, 2 Pages.

Weir SPM: "Weir SPM General Catalog: Well Service Pumps, Flow Control Products, Manifold Trailers, Safety Products, Post Sale Services," Weir Oil & Gas, Fort Worth, Texas, May 28, 2016, 40 Pages, Retrieved from URL: https://www.pumpfundamentals.com/pumpdatabase2/weir-spm-general.pdf.

Wikipedia: "Union Pacific GTELs," 1950, 7 Pages, Retrieved from URL: https://en.wikipedia.org/wiki/Union_Pacific_GTELs.

Wikipedia: "Westinghouse Combustion Turbine Systems Division," 1960, 33 Pages, Retrieved from URL: https://en.wikipedia.org/wiki/Westinghouse_Combustion_Turbine_Systems_Division.

Williams C.W (Gulf Oil Corp. Odessa Texas)., "The Use of Gas-Turbine Engines in an Automated High-Pressure Water-Injection Station," American Petroleum Institute, Drilling and Production Practice, API-63-144, Jan. 1, 1963, 2 Pages.

WMD Squared: "Turbine Frac Units," 2012, 4 Pages, Retrieved from URL: https://wmdsquared.com/work/gfes-turbine-frac-units/.

Wolf J.J., et al., "Safety Aspects and Environmental Considerations for a 10 MW Cogeneration Heavy Duty Gas Turbine Burning Coke Oven Gas with 60% Hydrogen Content," ASME 1992 International Gas Turbine and Aeroengine Congress and Exposition, American Society of Mechanical Engineers Digital Collection, Jun. 1-4, 1992, 8 Pages.

Worldcat: "WorldCat Library Collections Database Records for API Standard 671 and API Standard 674," 3 Pages, [Retrieved on Dec. 30, 2021] Retrieved from URL: https://www.worldcat.org/title/positive-displacement-pumps-reciprocating/ocic/858692269&referer=brief_results [Retrieved on Dec. 22, 2021] Retrieved from URL: https://www.worldcat.org/title/special-purpose-couplings-for-petroleum-chemical-and-gas-industry-services/ocic/871254217&referer=brief_results.

Yadav J.P., et al., "Power Enhancement of Gas Turbine Plant by Intake Air Fog Cooling," ResearchGate, Jun. 2015, vol. 3, No. 1, 15 Pages.

Youtube: "Jereh Fracturing Equipment," Jereh Group, Jun. 8, 2015, 1 Page, Retrieved from URL: https://www.youtube.com/watch?v=m0vMiq84P4Q.

Youtube: "Jereh Fracturing Equipment," Transcript of Jereh Group, Jun. 8, 2015, 1 Page, Retrieved from URL: https://www.youtube.com/watch?v=m0vMiq84P4Q.

Youtube: "Jereh Fracturing Unit, Fracturing Spread," Jereh Group, Mar. 30, 2015, 1 Page, Retrieved from URL: https://www.youtube.com/watch?v=PIkDbU5dE0o.

Youtube: "Jereh Fracturing Unit, Fracturing Spread," Transcript of Jereh Group, Mar. 30, 2015, 3 Pages.

ZSI-Foster: "Energy | Solar | Fracking | Oil and Gas," Aug. 2020, 2 Pages, Retrieved from URL: https://www.zsi-foster.com/energy-solar-fracking-oil-and-gas.html.

* cited by examiner

POWER SOURCES AND TRANSMISSION NETWORKS FOR AUXILIARY EQUIPMENT ONBOARD HYDRAULIC FRACTURING UNITS AND ASSOCIATED METHODS

CROSS-REFERENCE TO RELATED APPLICATION(S)

This application is a continuation of U.S. Non-Provisional application Ser. No. 18/116,383, filed Mar. 2, 2023, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,859,482, issued Jan. 2, 2024, which is a continuation of U.S. Non-Provisional application Ser. No. 17/976,095, filed Oct. 28, 2022, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. patent Ser. No. 11/629,584, issued Apr. 18, 2023, which is a continuation of U.S. Non-Provisional application Ser. No. 17/555,815, filed Dec. 20, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,530,602, issued Dec. 20, 2022, which is a continuation of U.S. Non-Provisional application Ser. No. 17/203,002, filed Mar. 16, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,236,739, issued Feb. 1, 2022, which is a divisional of U.S. Non-Provisional application Ser. No. 16/946,079, filed Jun. 5, 2020, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 10,989,180, issued Apr. 27, 2021, which claims the benefit of and priority to U.S. Provisional Patent Application No. 62/899,971, filed Sep. 13, 2019, titled "AUXILIARY DRIVE SYSTEMS AND ALTERNATIVE POWER SOURCES," the entire disclosures of each of which are incorporated herein by reference.

TECHNOLOGICAL FIELD

This disclosure relates generally to fracturing operations for oil and gas wells, and in particular, to power sources and networks for auxiliary equipment onboard hydraulic fracturing units and associated methods.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracking fluid into a well at high pressure and high flow rates. Some fracking fluids may take the form of a slurry including water, proppants (e.g., sand), and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation fails and begins to fracture.

By continuing to pump the fracking fluid into the formation, existing fractures in the formation are caused to expand and extend in directions farther away from a well bore, thereby creating flow paths to the well bore. The proppants may serve to prevent the expanded fractures from closing when pumping of the fracking fluid is ceased or may reduce the extent to which the expanded fractures contract when pumping of the fracking fluid is ceased. Once the formation is fractured, large quantities of the injected fracking fluid are allowed to flow out of the well, and the production stream of hydrocarbons may be obtained from the formation.

Hydraulic fracturing has commonly been performed with the use of a diesel engine that acts as the prime mover in the powertrain. This diesel engine is then directly mated with a transmission that in turn is coupled to a drive shaft that then is connected to a reciprocating plunger pump. When a gear is selected at the transmission the diesel engine may then transfer power and torque through to the pump resulting in the pumps crank turning and displacing fracturing fluid. Commonly, the use of diesel engines onboard hydraulic fracturing units may yield between 2,000 and 3,000 hydraulic horsepower (HHP). These kind of power outputs may at times result in up to twenty hydraulic fracturing units on location to be able to meet the flow and resultant pressure demand to fracture the sub-surface geological formation.

Diesel engine hydraulic fracturing units like all variations of hydraulic fracturing units have onboard auxiliary equipment that is required to operate in conjunction with the powertrain to ensure that equipment is lubricated and protected, and also to enhance to efficiency of the equipment. Examples of these onboard auxiliary equipment include lubrication pumps that provide low-pressure and high-pressure gear oil injection into the reciprocating pump crank case and bearing housings. The injection of this oil into the pump's power end ensures that friction between mating surfaces is reduced, and it also mitigates the heat rejection from this friction and prevents it from elevating to a temperature that may cause wear and premature failure.

Cooling equipment is another example of auxiliary equipment onboard many hydraulic fracturing units. The cooling equipment includes multiple cooling circuits for engine cooling, transmission cooling, pump lube oil cooling, hydraulic cooling and the like. This cooling equipment may include tube and shell heat exchangers, but it is more common to utilize fan-driven heat exchangers that allow for the control of fan speed that permits operators to mitigate the amount of cooling performed and conserve energy used to drive fan motors.

The auxiliary equipment onboard a diesel engine hydraulic fracturing unit, including the lubrication and cooling equipment, needs driving power to allow the equipment to perform respective functions and operate efficiently. The power used to drive these onboard auxiliary equipment is commonly hydraulic power from a power takeoff (PTO) that is located on the main diesel engine, and at times may see up to 100 HHP drawn from the diesel engine.

As an alternative to the diesel engine, electric fracking (or e-frac) uses an electric motor to drive a reciprocating fracturing pump. Electric fracturing sees power generated at a single source (usually from a turbine generator). This power source conditions and distributes the power through electric switching and drives, eventually providing power to the main electric motor that is equipped with a dual shaft that may power two pumps onboard a fracturing unit.

The use of electric power to drive fracturing pumps does not eliminate the requirement for onboard auxiliary equipment, but the utilization of high-voltage power may be conditioned and transformed into low voltages to run pumps, cooling equipment and other auxiliary equipment. The use of a single standalone turbine generator allows the auxiliary equipment to be powered from a standalone power source, and avoids the removal of power from the prime mover driving the pump as does a diesel engine hydraulic fracturing unit.

Although it may appear that an electric fracturing well site is also less congested than a diesel engine fracturing well site, both are often comparably congested. The assembly of two pumps per fracturing unit at an electric fracturing well site does see the pump count reduce by half. But the electric fracturing well site adds multiple drive and transformer trailers, as well as primary and backup turbine generators. Despite the vehicle and machinery count on location, the power utilization to both the pump and auxiliary equipment does often prove to be more efficient with electric motor efficiencies being greater than that of its hydraulic counterpart; however, the capital cost to implement such electric equipment and circuitry is far greater.

SUMMARY

In view of both diesel and electric fracturing technologies, a direct drive turbine (DDT) hydraulic fracturing unit has been developed that utilizes a dual fuel, dual shaft gas turbine engine as the prime mover in the hydraulic fracturing pump powertrain. The gas turbine engine is installed in a sound proof enclosure that allows the engine to be protected from adverse weather conditions. The gas turbine engine is directly mounted and coupled to a reduction transmission (e.g., gearbox) that in turn is connected to a drive shaft that finally connects to a reciprocating pump via a drive flange. These hydraulic fracturing units may output the HHP of two conventional diesel engines, or one electric fracturing unit, without the need for other electric-generation equipment.

A fundamental difference in the assembly of DDT hydraulic fracturing units is their onboard auxiliary equipment. There are more auxiliary circuits and equipment onboard a DDT hydraulic fracturing unit in comparison to a diesel engine hydraulic fracturing units due to the complexity and requirements of a gas turbine engine. The gas turbine engine has dual shafts with the output shaft reaching speeds of up to 16,000 revolutions per minute (RPM), and this makes running a PTO directly from the engine's output shaft a complex and costly development. Example implementations of the present disclosure are directed to power generation onboard a mobile turbine-engine driven hydraulic fracturing unit, and may include hydraulic power, electric power, or both hydraulic power and electric power.

The present disclosure includes, without limitation, the following example implementations.

Some example implementations provide a system for fracturing a well. The system includes one or more one or more hydraulic fracturing units. Each hydraulic fracturing unit includes a chassis, a reciprocating plunger pump connected to the chassis and configured to pump a fracturing fluid, and a powertrain connected to the chassis and configured to power the reciprocating plunger pump. The powertrain includes a direct drive gas turbine engine and a drivetrain, and the direct drive gas turbine engine is operable using of two or more different types of fuel. The hydraulic fracturing unit also includes auxiliary equipment located onboard the chassis, and driven by electric motors to support operation of the hydraulic fracturing unit including the reciprocating plunger pump and the powertrain.

The system also includes one or more electric power arrangements configured to power the auxiliary equipment. Each electric power arrangement includes an engine-generator set configured to generate electric power, and an electric power network coupled to the engine-generator set and the electric motors. The electric power network is also coupled or coupleable to a utility power grid, a battery bank or a second engine-generator set of a neighboring hydraulic fracturing unit. The electric power network is configured to deliver the electric power generated by the engine-generator set to the electric motors to drive the auxiliary equipment. And the electric power network is configured to switchably connect the utility power grid, the battery bank or the second engine-generator set to deliver power to the electric motors responsive to a failure or fault of the engine-generator set.

In some examples, the engine-generator set includes a diesel engine and an electric motor generator, and the diesel engine is configured to drive the electric motor generator to generate the electric power. In some other examples, the engine-generator set includes a gas turbine engine and an electric generator, and the gas turbine engine is configured to drive the electric generator to generate the electric power.

In some examples, the hydraulic fracturing unit(s) are a plurality of hydraulic fracturing units, and the electric power arrangement(s) are a plurality of electric power arrangements each of which is connected to the chassis of a respective one of the hydraulic fracturing units. In some other examples, the electric power arrangement(s) include the electric power arrangement that is configured to power the auxiliary equipment across the hydraulic fracturing units.

Some other example implementations provide a system for fracturing a well. The system includes also one or more one or more hydraulic fracturing units, and the auxiliary equipment is driven by hydraulic motors to support operation of the hydraulic fracturing unit including the reciprocating plunger pump and the powertrain. The system of these other example implementations also includes one or more hydraulic power arrangements configured to power the auxiliary equipment. Each hydraulic power arrangement includes a hydraulic power source and a hydraulic power network. The hydraulic power source includes an electric motor configured to drive a plurality of pumps via a hydraulic pump drive to generate hydraulic power, and the electric motor is powered by shore power from an external source of electric power. The hydraulic power network is coupled to the hydraulic power source and the hydraulic motors, and configured to deliver the hydraulic power generated by the hydraulic power source to the hydraulic motors to drive the auxiliary equipment.

Some yet other example implementations provide a system for fracturing a well. The system includes also one or more one or more hydraulic fracturing units, and the auxiliary equipment is driven by hydraulic motors to support operation of the hydraulic fracturing unit including the reciprocating plunger pump and the powertrain. The system also includes one or more hydraulic power arrangements configured to power the auxiliary equipment. Each hydraulic power arrangement includes a plurality of power takeoffs (PTOs) connected to a transmission of the drivetrain. The PTOs are equipped with respective electric motor generators and pump, and the transmission is configured to drive the respective electric motor generators to generate electric power from which the respective pumps are powered to generate hydraulic power. The hydraulic power arrangement also includes a hydraulic power network coupled to the PTOs and the hydraulic motors. The hydraulic power network is configured to deliver the hydraulic power generated by the multi-stage pump to the hydraulic motors to drive the auxiliary equipment.

Example implementations also provide methods of fracturing a well. The methods of some example implementations includes arranging hydraulic fracturing unit(s) with auxiliary equipment driven by electric or hydraulic motors. The method includes arranging electric or hydraulic power arrangement(s) to power the auxiliary equipment. And the method includes operating the powertrain to power reciprocating plunger pump to pump fracturing fluid, and the electric/hydraulic power arrangement to power the auxiliary equipment.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURES

Figure 1:
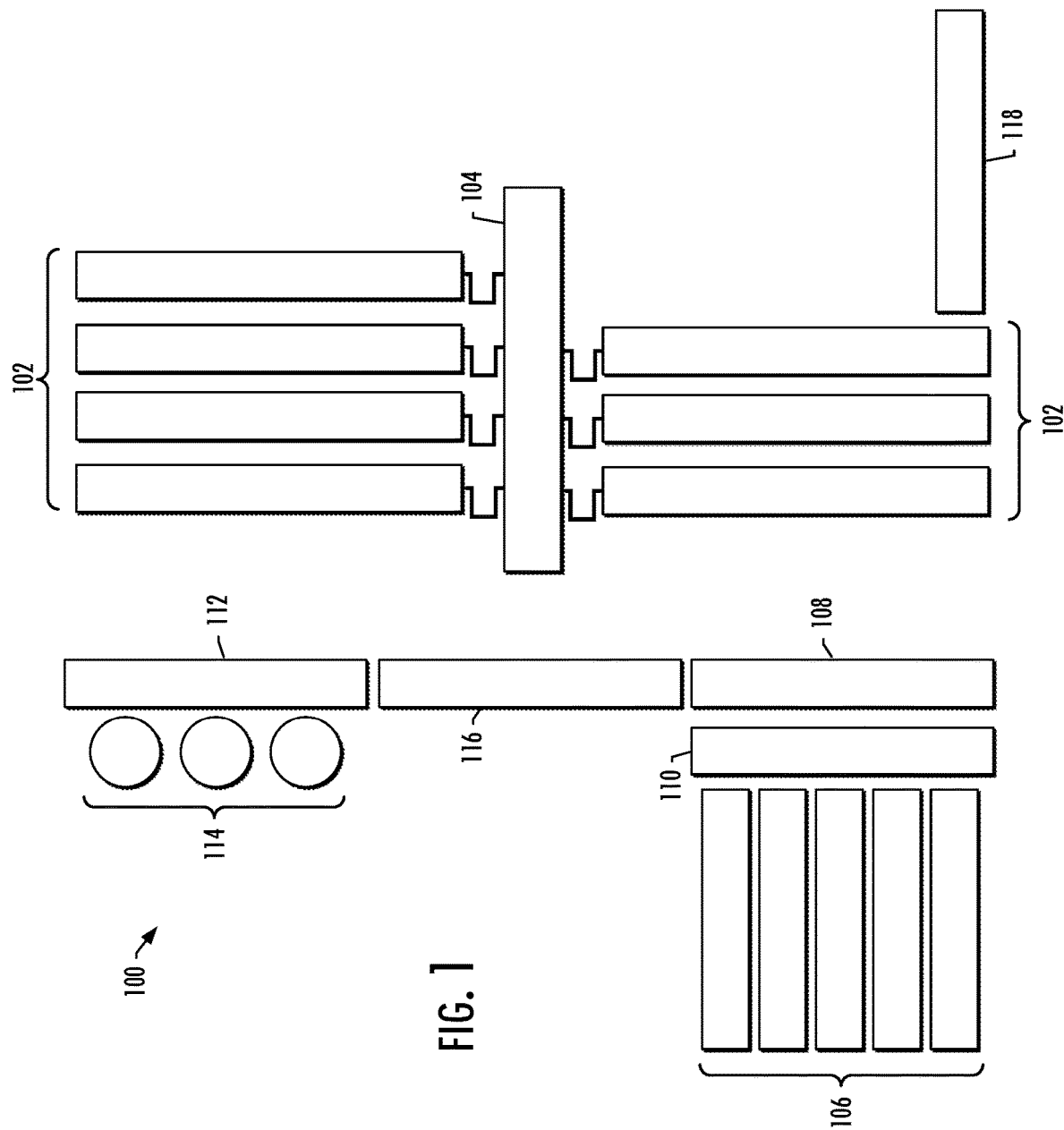
Figure 2:
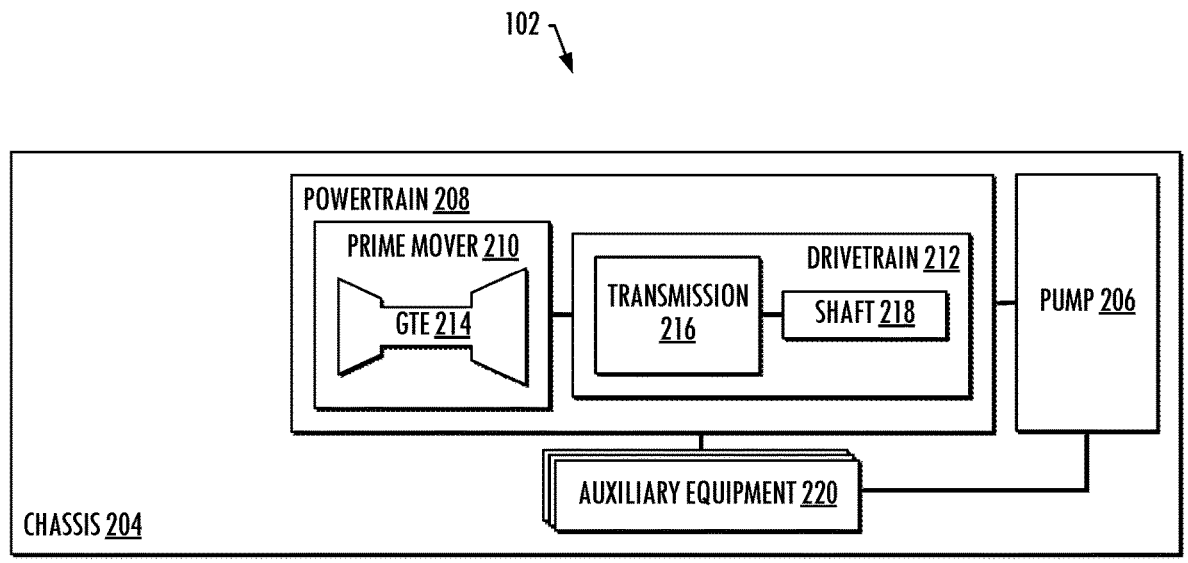
Figure 3:
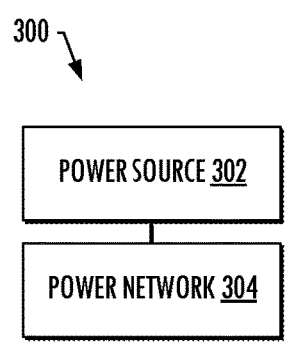
Figure 4:
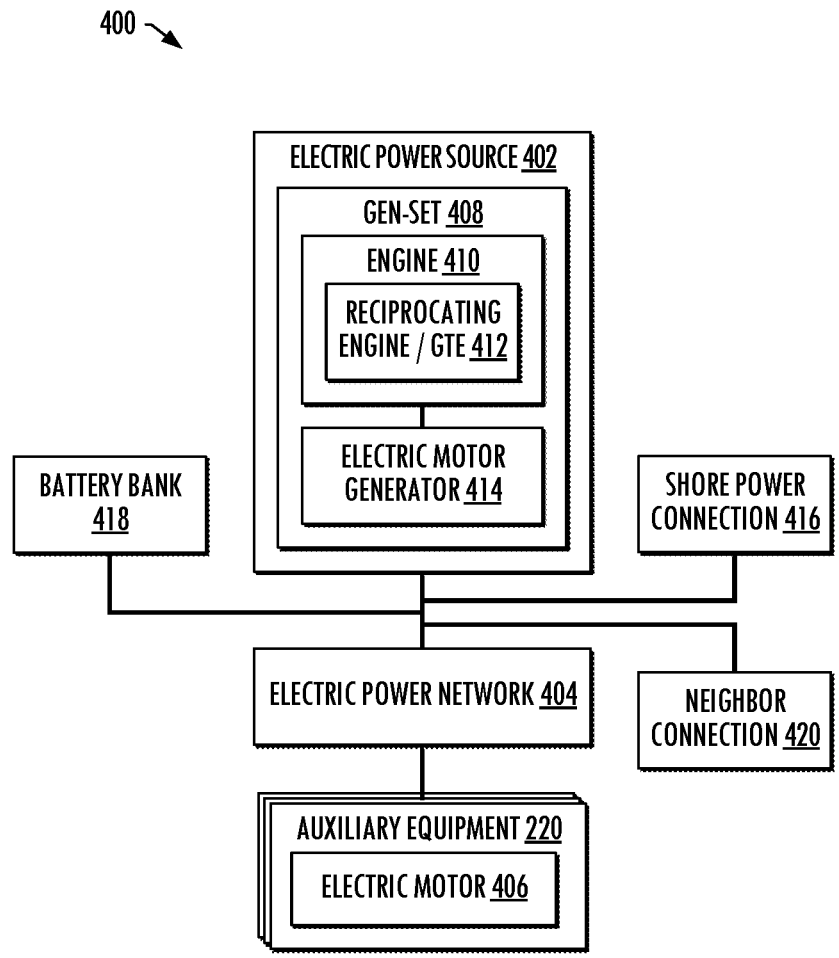
Figure 5:
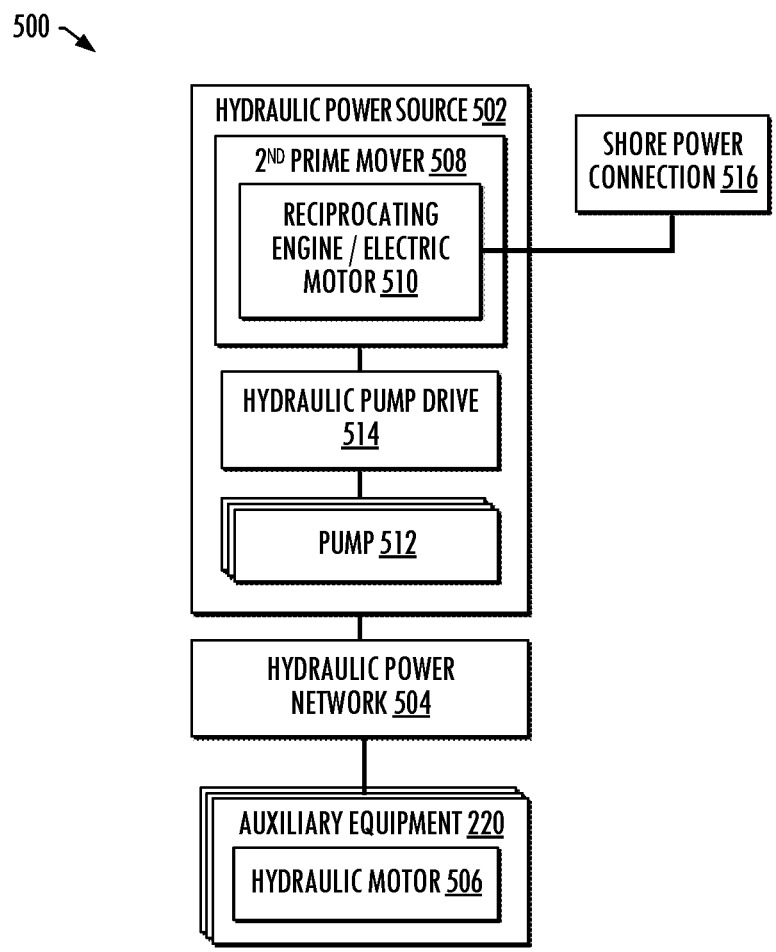
Figure 6:
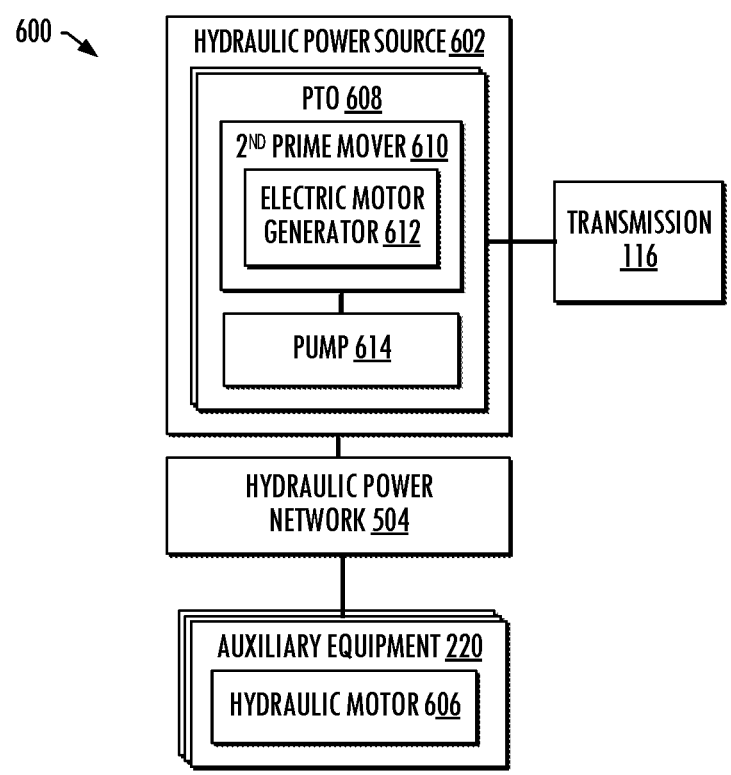
Figure 7:
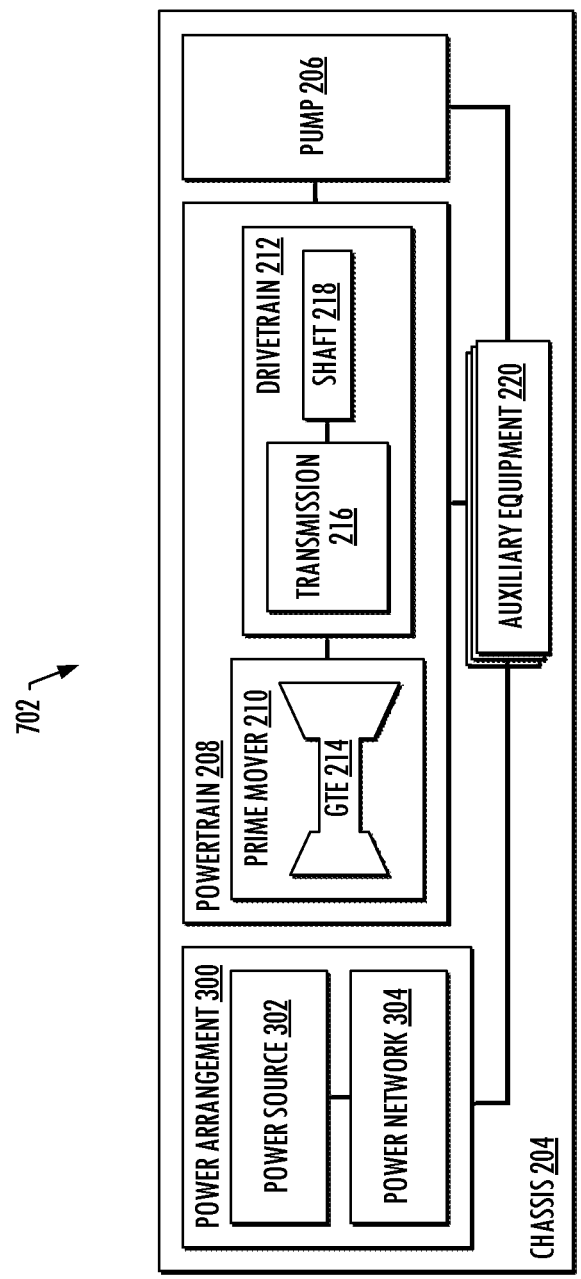
Figure 8:
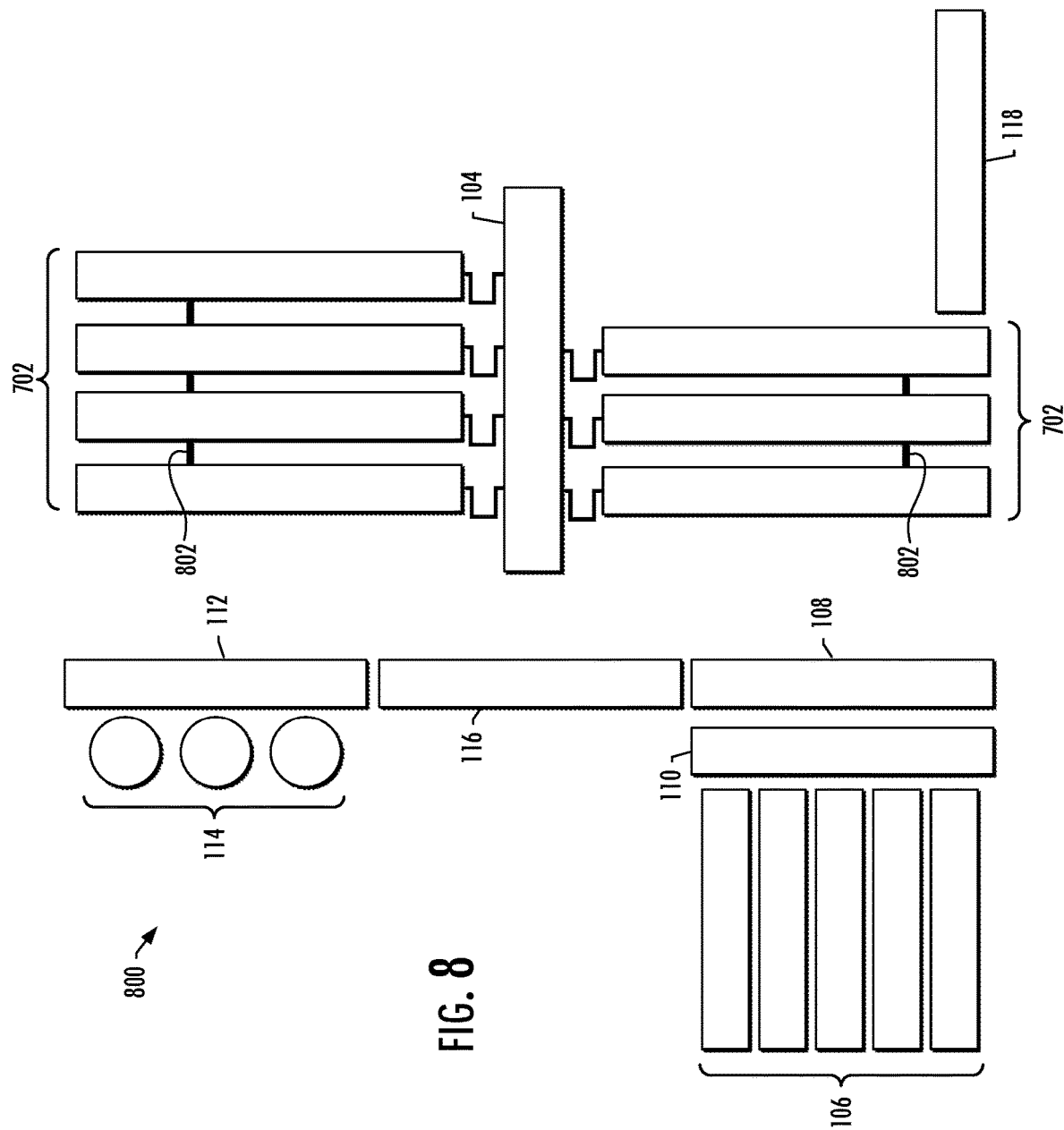
Figure 9:
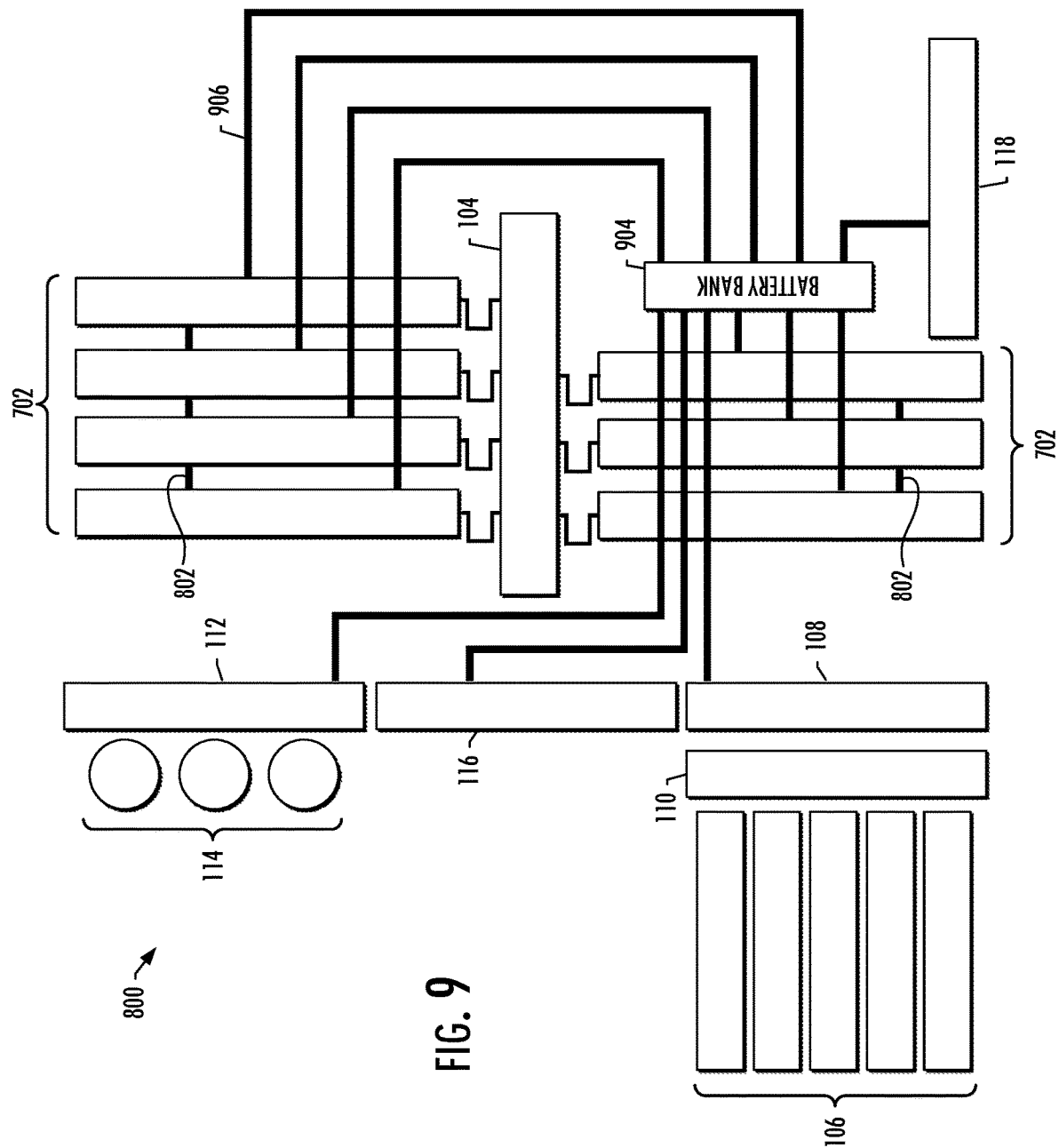
Figure 10:
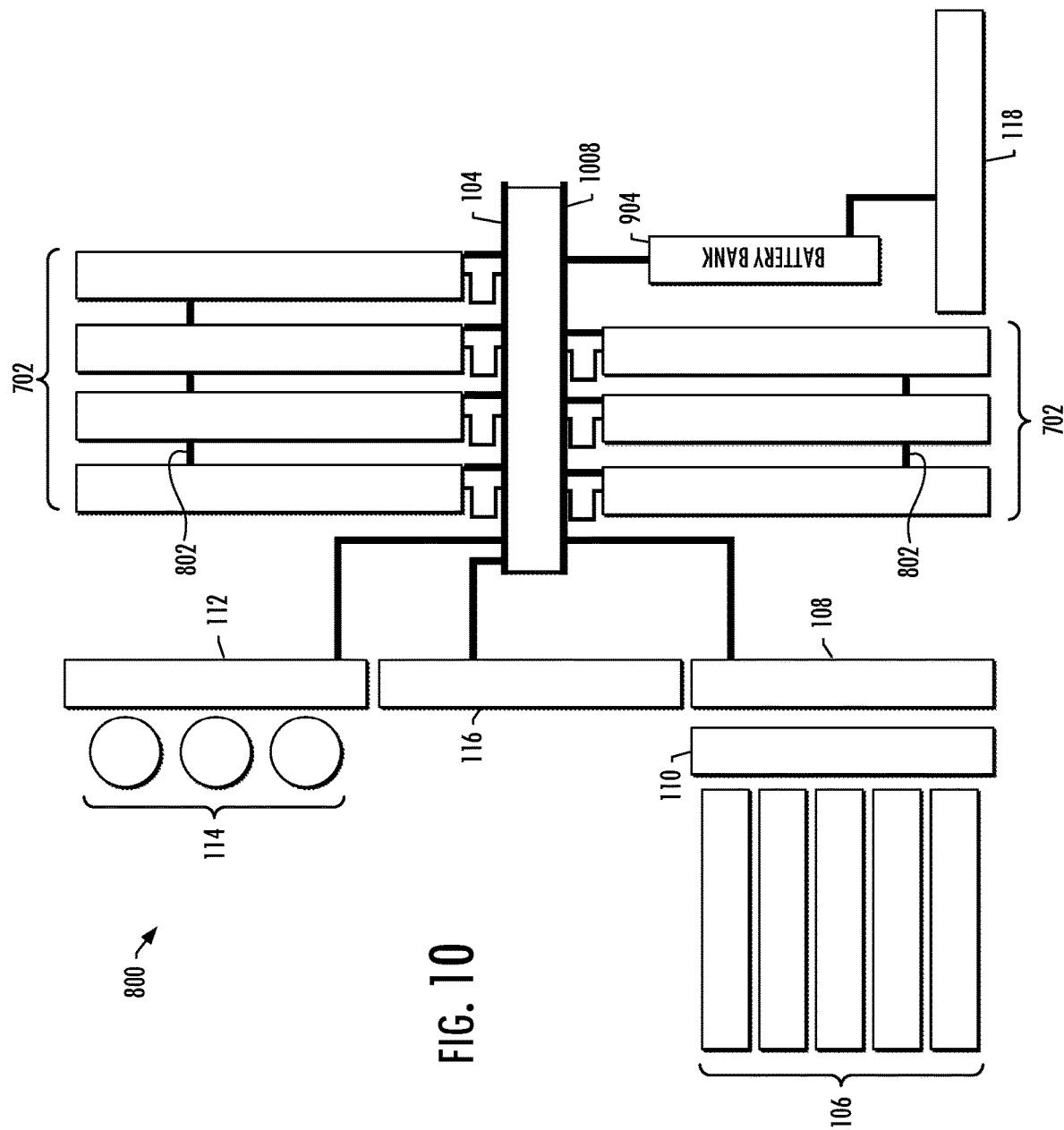
Figure 15:
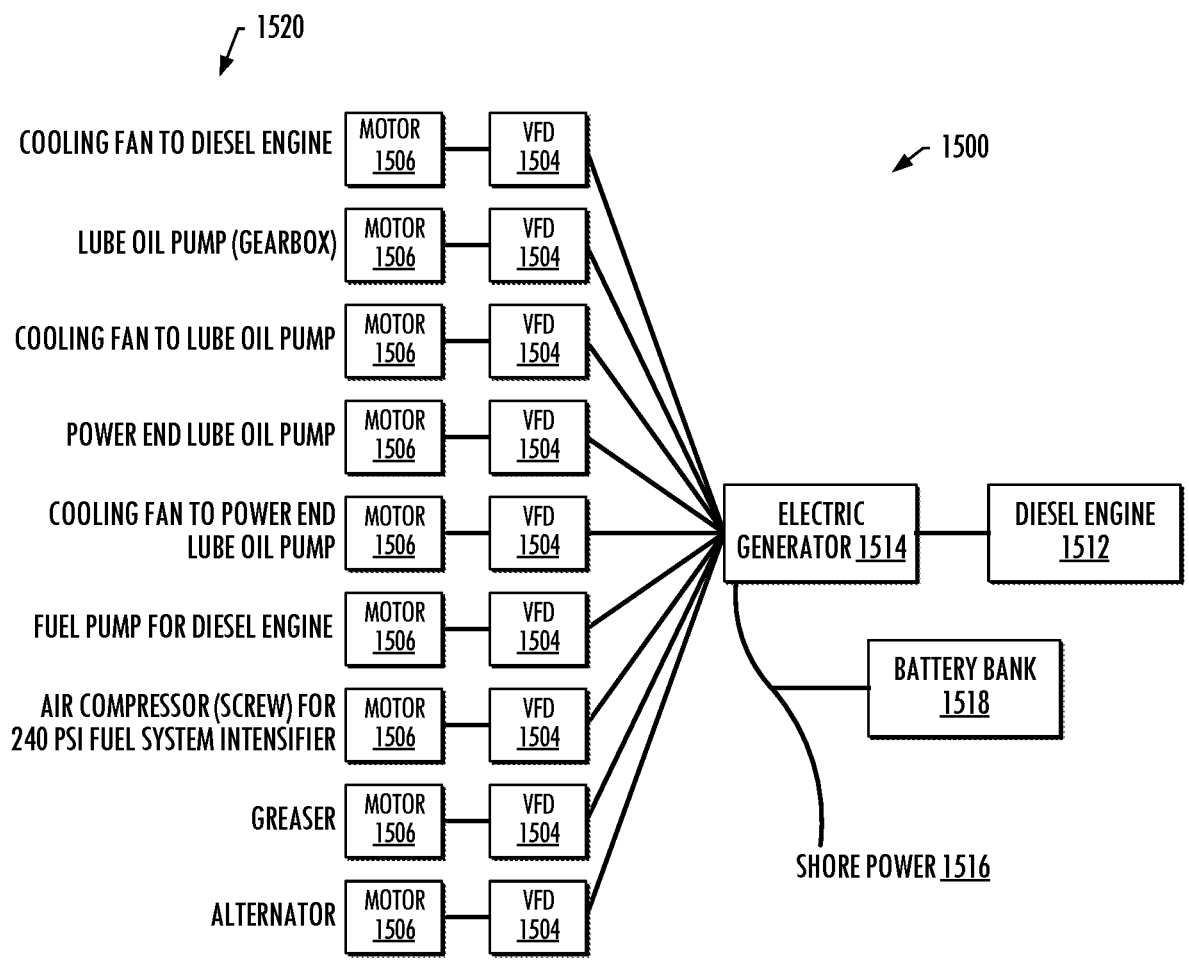
Figure 16:
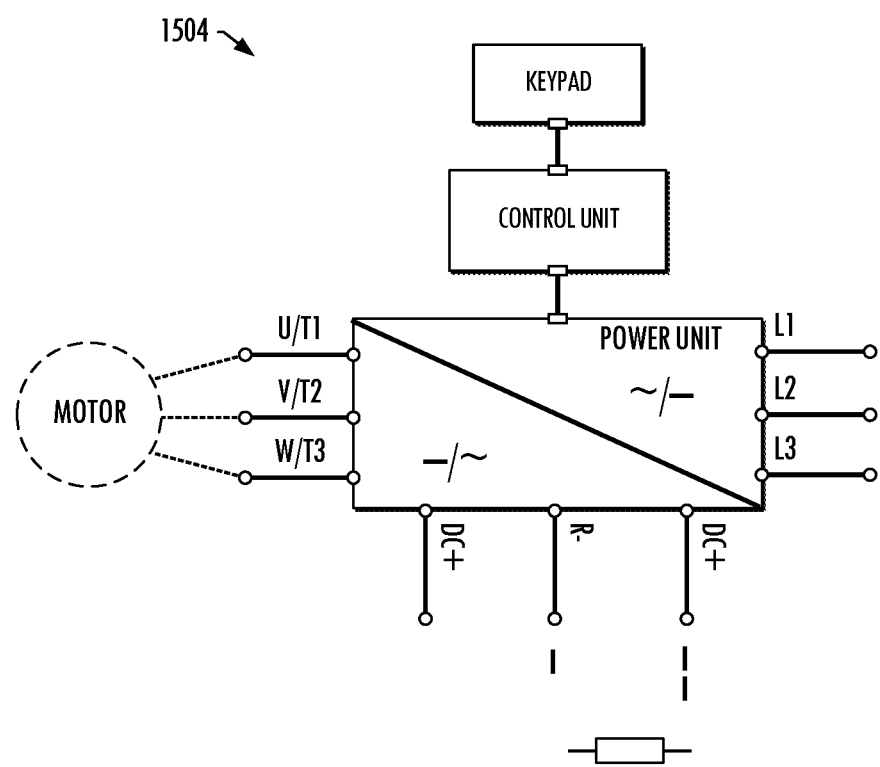
Figure 17:
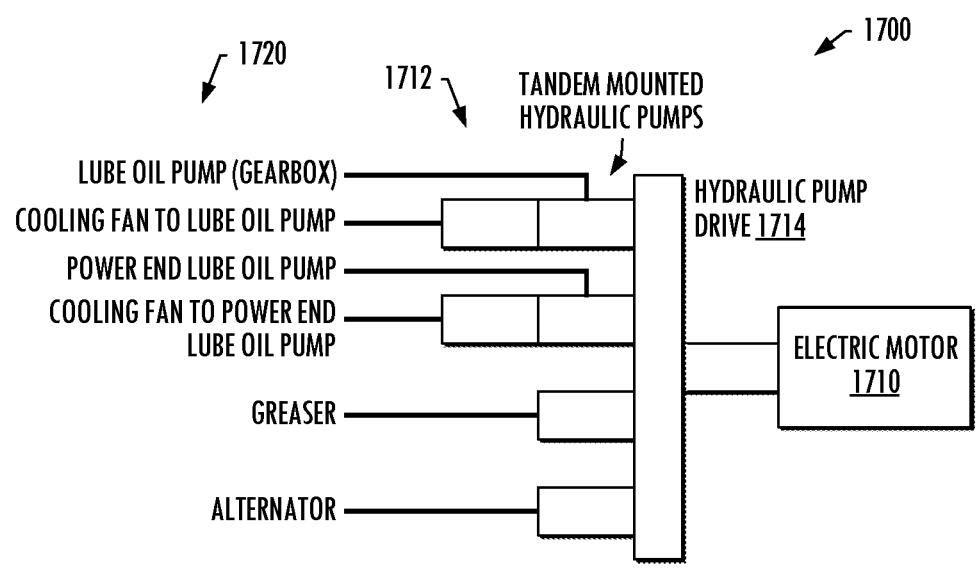
Figure 18:
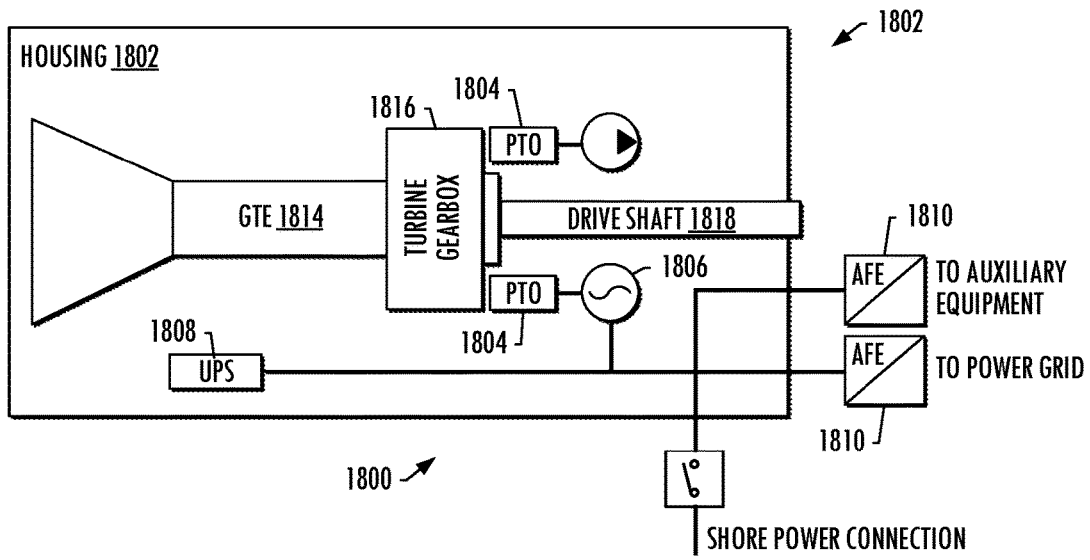
Figure 19:
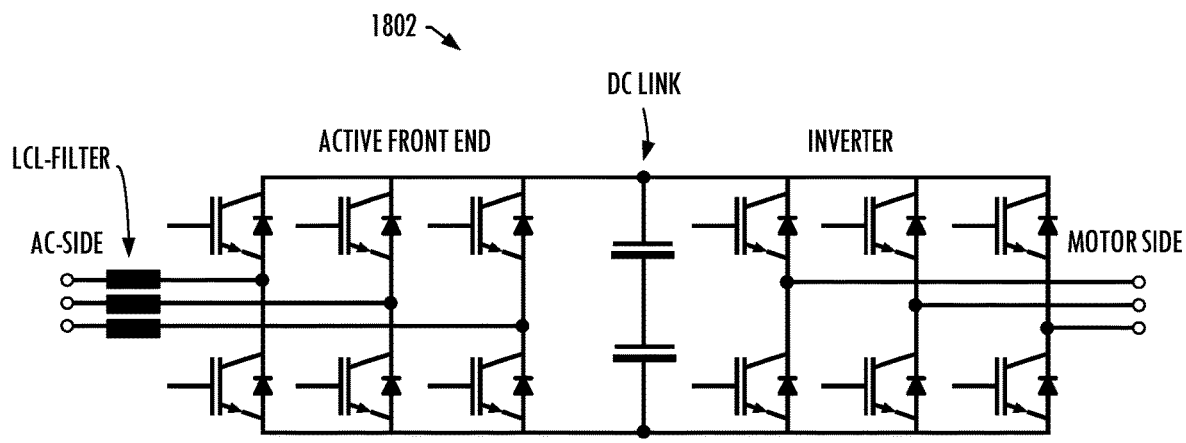
Figure 20:
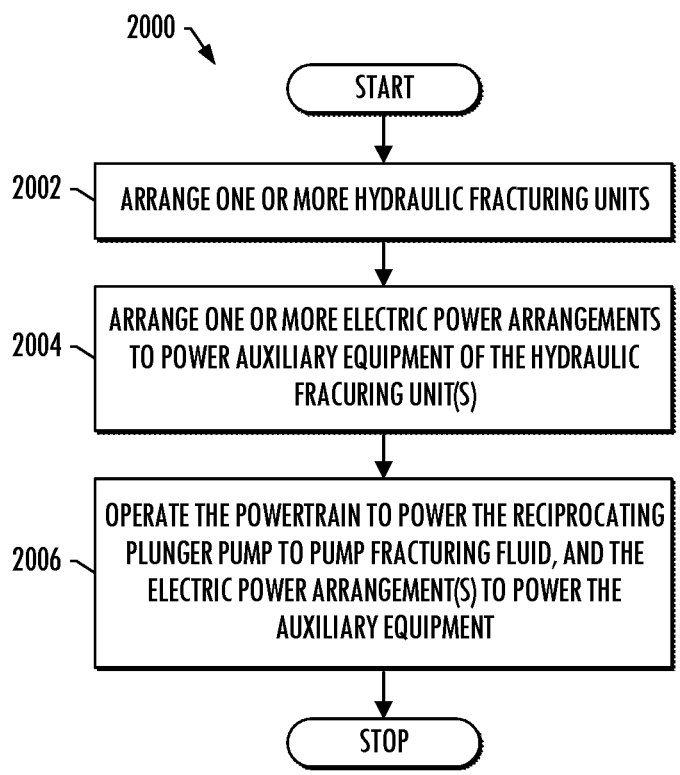
Figure 21:
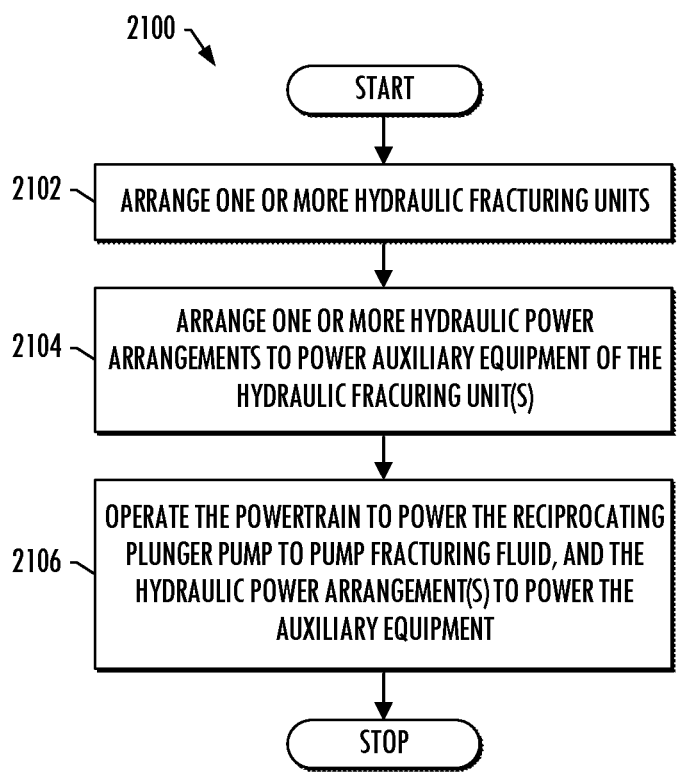

Having thus described aspects of the disclosure in the foregoing general terms, reference will now be made to the accompanying figures, which are not necessarily drawn to scale, and wherein:

FIG. 1 is a block diagram of a system for fracturing a well according to some example implementations of the present disclosure;

FIG. 2 is a block diagram of a hydraulic fracturing unit according to some example implementations;

FIG. 3 illustrates a power arrangement configured to power auxiliary equipment onboard the hydraulic fracturing unit, according to some example implementations;

FIG. 4 illustrates an example in which the power arrangement is an electric power arrangement, according to some example implementations;

FIGS. 5 and 6 illustrate examples in which the power arrangement is a hydraulic power arrangement, according to some example implementations;

FIG. 7 illustrates an example in which the power arrangement is onboard the hydraulic fracturing unit, according to some example implementations;

FIGS. 8, 9 and 10 are block diagrams of a system with a plurality of hydraulic fracturing units with respective onboard power arrangements configured to power to respective auxiliary equipment, according to some example implementations;

FIGS. 11, 12, 13 and 14 are block diagrams of a system with a plurality of hydraulic fracturing units, and a power arrangement configured to power to respective auxiliary equipment across the plurality of hydraulic fracturing units, according to some example implementations;

FIG. 15 illustrates another example of an electric power arrangement according to some example implementations;

FIG. 16 illustrates an example of a variable frequency drive (VDD) with connections to an AC motor, according to some example implementations;

FIG. 17 is a block diagram another example hydraulic power arrangement according to some example implementations;

FIG. 18 is a block diagram another power arrangement according to some example implementations;

FIG. 19 illustrates an active front end (AFE) according to some example implementations; and FIGS. 20 and 21 are flowcharts illustrating various operations in methods of fracturing a well, according to various example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form.

FIG. 1 illustrates a system 100 for fracturing a well according to some example implementations of the present disclosure. As shown, the system generally includes a plurality of plurality of hydraulic fracturing units 102 configured to pump a fracturing fluid, and a manifold 104 from which the fracturing fluid is delivered to the well.

More particularly, in the system 100 shown in FIG. 1, water from tanks 106 and gelling agents dispensed by a chemical unit 108 are mixed in a hydration unit 110. The discharge from hydration unit, along with sand carried on conveyors 112 from sand tanks 114 is fed into a blender 116 that mixes the gelled water and sand into fracturing fluid (a slurry). The blender discharges the fracturing fluid through low-pressure hoses that convey it into two or more low-pressure lines in the manifold 104. The low-pressure lines in the manifold feed the fracturing fluid to the hydraulic fracturing units 102, perhaps as many as a dozen or more, through low-pressure "suction" hoses.

The hydraulic fracturing units 102 take the fracturing fluid and discharge it at high pressure through individual high-pressure "discharge" lines into two or more high-pressure lines or "missiles" on the manifold 104. The missiles flow together, i.e., they are manifolded on the manifold. Several high-pressure flow lines run from the manifolded missiles to a "goat head" that delivers the fracturing fluid into a "zipper" manifold. The zipper manifold allows the fracturing fluid to be selectively diverted to, for example, one of two well heads. Once fracturing is complete, flow back from the fracturing operation discharges into a flowback manifold which leads into flowback tanks.

Because systems for fracturing a well are required on site for a relatively short period of time, the larger components of the system 100 typically are transported to a well site on skids, trailers, or trucks as more or less self-contained units. They then are connected to the system by one kind of conduit or another. In FIG. 1, for example, the hydraulic fracturing units, chemical unit 108, hydration unit 110 and blender 116 may be mounted on a trailer that is transported to the well site by a truck. Because they are designed to be more or less self-contained units, however, they are complex machines and incorporate several distinct subsystems and a large number of individual components.

FIG. 2 illustrates a hydraulic fracturing unit 102 according to some example implementations of the present disclosure. The hydraulic fracturing unit includes a chassis 204, and a pump 206, such as a reciprocating pump, connected to the chassis and configured to pump a fracturing fluid. In some examples, the chassis may include a trailer (e.g., a flat-bed trailer) and/or a truck body to which the components of the hydraulic fracturing unit may be connected. For example, the components may be carried by trailers and/or incorporated into trucks, so that they may be easily transported between well sites.

The pump 206 may be reciprocating plunger pump including a power end and a fluid end. The power end transforms rotational motion and energy from a powertrain 208 into the reciprocating motion that drives plungers in the fluid end. In the fluid end, the plungers force fluid into a pressure chamber that is used to create high pressure for well servicing. The fluid end may also include a discharge valve assembly and a suction valve assembly.

The hydraulic fracturing unit 102 includes the powertrain 208 also connected to the chassis and configured to power the pump. In this regard, the powertrain includes a prime mover 210 and a drivetrain 212. In some examples, the hydraulic fracturing unit is a direct drive turbine (DDT) unit in which the prime mover is or includes a gas turbine engine (GTE) 214. As also shown, the drivetrain includes a reduction transmission 216 (e.g., gearbox) connected to a drive shaft 218, which, in turn, is connected to the pump such as via an input shaft or input flange of the pump. Other types of GTE-to-pump arrangements are contemplated.

In some examples, the GTE 214 may be a direct drive GTE. The GTE may be a dual-fuel or bi-fuel GTE, for example, operable using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include compressed natural gas (CNG), natural gas, field gas, pipeline gas, methane, propane, butane, and/or liquid fuels, such as, for example, diesel fuel (e.g., #2 Diesel), bio-diesel fuel, bio-fuel, alcohol, gasoline, gasohol, aviation fuel, etc. Gaseous fuels may be supplied by CNG bulk vessels, a gas compressor, a liquid natural gas vaporizer, line gas, and/or well-gas produced natural gas. Other types and sources of fuel are contemplated. The GTE may be operated to provide horsepower to drive the pump 206 via the drivetrain 212 to safely and successfully fracture a formation during a well stimulation project.

As also shown, the hydraulic fracturing unit 102 includes auxiliary equipment 220 located onboard the chassis 204, and configured to support operation of the hydraulic fracturing unit including the pump 206 and the powertrain 208. As described above, the auxiliary equipment onboard the hydraulic fracturing unit may include lubrication and cooling equipment such as cooling fans and lubrication pumps. More particular examples of auxiliary equipment include a lube oil pump coupled to the reduction transmission 216, a cooling fan coupled to a reduction transmission lube oil pump, a lube oil pump coupled to the power end of the pump, a cooling fan coupled to a power end lube oil pump, a cooling fan to the GTE 214, a GTE air cooling fan, a screw type air compressor, an air dryer, greater equipment for the pump 206, an air intake blower fan motor, a GTE controller, a hydraulic starter pump, a GTE lube cooling fan, a telescope exhaust winch, a master programmable logic controller (PLC), and the like.

As shown in FIG. 3, example implementations of the present disclosure provide a power arrangement 300 configured to power the auxiliary equipment 220. As explained in greater detail below, the system 100 may include the power arrangement may be located onboard the hydraulic fracturing unit 102, such as on the gooseneck of a trailer. Additionally or alternatively, the system 100 may include the power arrangement configured to power the auxiliary equipment across the plurality of hydraulic fracturing units if not also backside equipment such as the chemical unit 108, hydration unit 110, conveyors 112, sand tanks 114, blender 116 and the like. In some examples, the backside equipment may also include a data center 118.

As shown, the power arrangement 300 generally includes a power source 302 and a power network 304. The power source is configured to generate power for the auxiliary equipment. The power network is coupled to the power source and the auxiliary equipment, and configured to deliver the power generated by the power source to the auxiliary equipment.

In various examples, the power arrangement 300 may be an electric power arrangement or a hydraulic power arrangement. FIG. 4 illustrates an example in which the power arrangement 300 is an electric power arrangement 400. In this example, the power source 224 is an electric power source 402 configured to generate electric power for the auxiliary equipment 220, and the power network is an electric power network 404 configured to deliver the electric power to the auxiliary equipment, which may include one or more electric motors 406.

As shown in FIG. 4, in some examples, the electric power source 402 includes an engine-generator set 408 with an engine 410, such as a reciprocating engine or GTE 412, and an electric generator such as an electric motor generator 414. One example of a suitable reciprocating engine is a diesel engine such as a tier four diesel engine, and one example of a suitable electric motor generator is a permanent magnet (PM) motor generator.

One particular example of a suitable GTE 412 that could be made part of the electric power source 402 is a microturbine from Capstone Turbine Corporation, although other turbines with similar technology and compact foot print could also be used. Gas turbine engines such as Capstone microturbines can be installed individually or in a parallel multipack configuration to create a local power grid that can be quiet, lightweight, modular and have low maintenance. Capstone microturbines and others like them have similar fuel capabilities to that of the Vericor TF50F turbine engine in such a way that even though natural gas is their preferred fuel source, diesel can be introduced as fuel for the turbine for a short period of time making this turbine adaptable to operating conditions and fuel shortage scenarios.

The utilization of a microturbine as the GTE 412 in the electric power source 402 may result in lower emissions to that of a reciprocating engine such as a diesel engine. This may allow for a single fuel hook up for CNG, reduce total operating costs, and reduce the power generation package size on the hydraulic fracturing unit 102. Other machinery and components associated with the main turbine air intake conditioning such as chillers and filters may also be shared with this microturbine.

In some examples, the electric power arrangement 400 further includes a connection 416 to shore power from an external source of electric power, such as a utility power grid, another engine-generator set or the like, from which the auxiliary equipment 220 are also powerable. Additionally or alternatively, in some examples, the electric power arrangement further includes a battery bank 418 chargeable from the power generated by the electric motor generator 414, and from which the auxiliary equipment are also powerable. The battery bank may include one or more batteries such as lithium on or lead acid batteries. In some examples in which the power arrangement 300 is onboard the hydraulic fracturing unit 102, and the hydraulic fracturing units of the system 100 include respective power arrangements, the electric power arrangement further includes a connection 420 to a second power arrangement of a neighboring hydraulic fracturing unit from which the auxiliary equipment are also powerable.

The auxiliary equipment 220 may be powered from the engine-generator set 408, the shore power from the external source of electric power, the second electric power arrangement from a neighboring hydraulic fracturing unit 102, or the battery bank 418. In some examples, the electric power network 404 is configured to deliver the electric power generated by the engine-generator set to the electric motors 406 to drive the auxiliary equipment. In some of these examples in which the engine-generator set experiences a fault or failure, the electric power network may then, in response, switchably connect the utility power grid, the battery bank or the second engine-generator set to deliver power to the electric motors.

FIG. 5 illustrates an example in which the power arrangement 300 is a hydraulic power arrangement 500. In this example, the power source 224 is a hydraulic power source 502 configured to generate hydraulic power for the auxiliary equipment 220, and the power network is a hydraulic power network 504 configured to deliver the hydraulic power to the auxiliary equipment, which may include one or more hydraulic motors 506. As shown in FIG. 5, the hydraulic power source 502 includes a second prime mover 508, such as a reciprocating engine or an electric motor 510, connected to a plurality of pumps 512 via a hydraulic pump drive 514. One example of a suitable electric motor is a PM motor. In some examples, the hydraulic power arrangement further includes a connection 516 to shore power from an external source of electric power, such as a utility power grid, another engine-generator set or the like, from which the electric motor may be powered.

FIG. 6 illustrates another example in which the power arrangement 300 is a hydraulic power arrangement 600. Similar to FIG. 5, in this example, the power source 224 is a hydraulic power source 602 configured to generate hydraulic power for the auxiliary equipment 220, and the power network is a hydraulic power network 504 configured to deliver the hydraulic power to the auxiliary equipment, which may include hydraulic motors 606. As shown in FIG. 6, however, the hydraulic power source includes a plurality of power takeoffs (PTOs) 608 connected to the transmission 216 of the hydraulic fracturing unit 102. Each of the plurality of PTOs is equipped with a second prime mover 610, such as an electric motor generator 612, and a pump 614. The hydraulic power source therefore including a plurality of PTOs with respective second prime movers and pumps.

As indicated above, the power arrangement 300 the power arrangement may be located onboard the hydraulic fracturing unit 102. FIG. 7 illustrates an example implementation of a hydraulic fracturing unit 702 in which the power arrangement 300 is connected to the chassis and configured to power the auxiliary equipment 220. FIGS. 8, 9 and 10 illustrate examples of a system 800 including a plurality of these hydraulic fracturing units 702 with respective power arrangements.

As shown in FIGS. 7 and 8, the system 800 for fracturing a well includes a plurality of hydraulic fracturing units 702 including respective pumps 206 configured to pump a fracturing fluid. The plurality of hydraulic fracturing units include respective powertrains 208 configured to power the respective pumps, and respective auxiliary equipment 220 configured to support operation of respective ones of the plurality of hydraulic fracturing units including the respective pumps and the respective powertrains. In addition, the plurality of hydraulic fracturing units further includes respective power arrangements 300 configured to power to the respective auxiliary equipment.

In some examples, the plurality of hydraulic fracturing units 702 include neighboring hydraulic fracturing units, and the respective power arrangements 300 of the neighboring hydraulic fracturing units are connected to one another, and from which the respective auxiliary equipment 220 of the neighboring hydraulic fracturing units are also powerable. This is shown by power cables 802 between neighboring hydraulic fracturing units in FIG. 8.

In the event power is lost on a hydraulic fracturing unit 702 equipped with a respective power arrangement 300, an automatic switching mechanism may allow neighboring hydraulic fracturing units joined by a receptacle and plug to share power. The neighboring hydraulic fracturing unit, then, may be able to provide power to the hydraulic fracturing unit allowing its auxiliary equipment. If for some reason both hydraulic fracturing units wanted to operate at the same time and distribute both of their power to a third hydraulic fracturing unit, the inclusion of synchronizing components such as a synchro scope may ensure the speed and frequency of their power arrangements are the same.

As shown in FIGS. 9 and 10, in some examples, the system 800 further includes a battery bank 904 connected to the respective power arrangements of the hydraulic fracturing units 702 that are configured to generate power from which the battery bank is chargeable. In some of these examples, the battery bank is configured to power the respective auxiliary equipment 220 from the power generated by the respective power arrangements. In addition, backside equipment such as one or more of the chemical unit 108, hydration unit 110, conveyors 112, sand tanks 114, blender 116 or data center 118 may be powered by the battery bank.

In FIG. 9, the battery bank 904 is directly connected to the respective power arrangements by respective power cables 906. In FIG. 10, in some examples, the system 800 further includes an electric bus 1008 connecting the respective power arrangements of the hydraulic fracturing units 702, if not also the backside equipment, to the battery bank. The electric bus may also function as the power share and distribution path. In some of these other examples, the electric bus is connected to the manifold 104. Even further, in some examples, the battery bank is also connected to shore power from an external source of electric power (e.g., utility power grid), from which the battery bank may also be chargeable and/or the respective auxiliary equipment may also be powerable. This is shown in FIGS. 9 and 10 in which the battery bank is connected to the data center 118 that is in turn connected to shore power from the external source of electric power.

In other example implementations, the system may include the power arrangement configured to power the auxiliary equipment across the plurality of hydraulic fracturing units 102 if not also backside equipment such as the chemical unit 108, hydration unit 110, conveyors 112, sand tanks 114, blender 116, data center 118 and the like. FIGS. 11, 12, 13 and 14 illustrate examples of a system 1100 including a plurality of hydraulic fracturing units, and a power arrangement 300 connected to the hydraulic fracturing units, and configured to power the respective auxiliary equipment 220 across hydraulic fracturing units. In addition, backside equipment may be powered by power arrangement.

Due to high amperage draw from hydraulic fracturing units 102, single power cables carrying the necessary voltage from the power arrangement 300 to the hydraulic fracturing units may not be suitable due to this amperage rating being unachievable. Each hydraulic fracturing unit that relies on the power arrangement to power its auxiliary equipment may have a divided bus to allow the total amperage to the hydraulic fracturing unit to be halved over an aluminum or copper bus bar allowing a single power cable to power each bus. Some backside equipment such as the chemical unit 108 and data center 118 may not require high continuous power and can be equipped with a single power distribution such as a bus bar.

Figure 11:
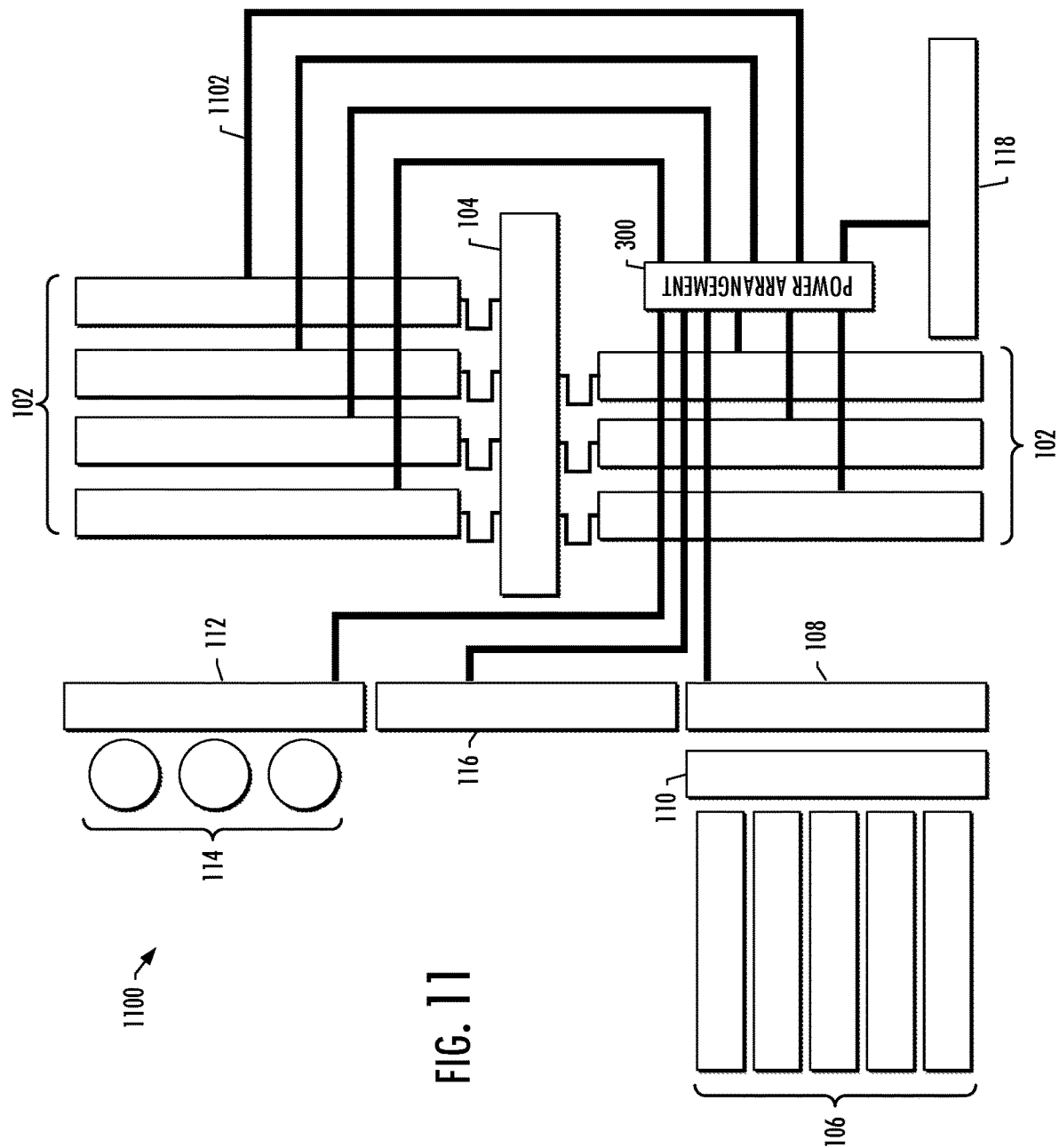
Figure 12:
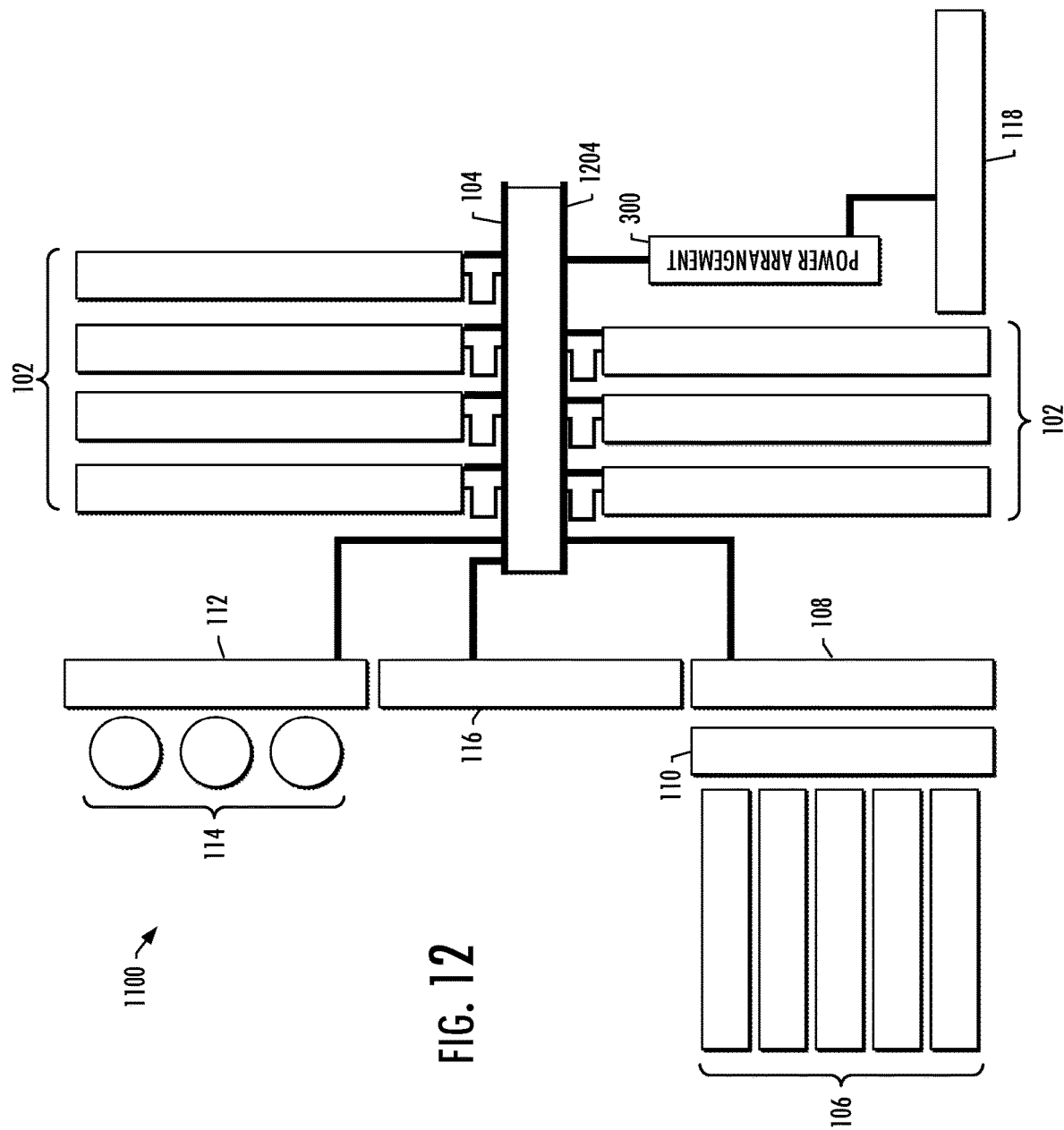

In FIG. 11, the power arrangement 300 is directly connected to the hydraulic fracturing units 102 (and perhaps also the backside equipment) by respective power cables 1102. In FIG. 12, in some examples, the system 1100 further includes an electric bus 1204 connecting the hydraulic fracturing units (and perhaps also the backside equipment) to the power arrangement. Similar to before, in some of these other examples, the electric bus is connected to the manifold 104. Even further, in some examples, the power arrangement is also connected to shore power from an external source of electric power (e.g., utility power grid), from which the respective auxiliary equipment may also be powerable. This is shown in FIGS. 11 and 12 in which the power arrangement is connected to the data center 118 that is in turn connected to shore power from the external source of electric power.

Figure 13:
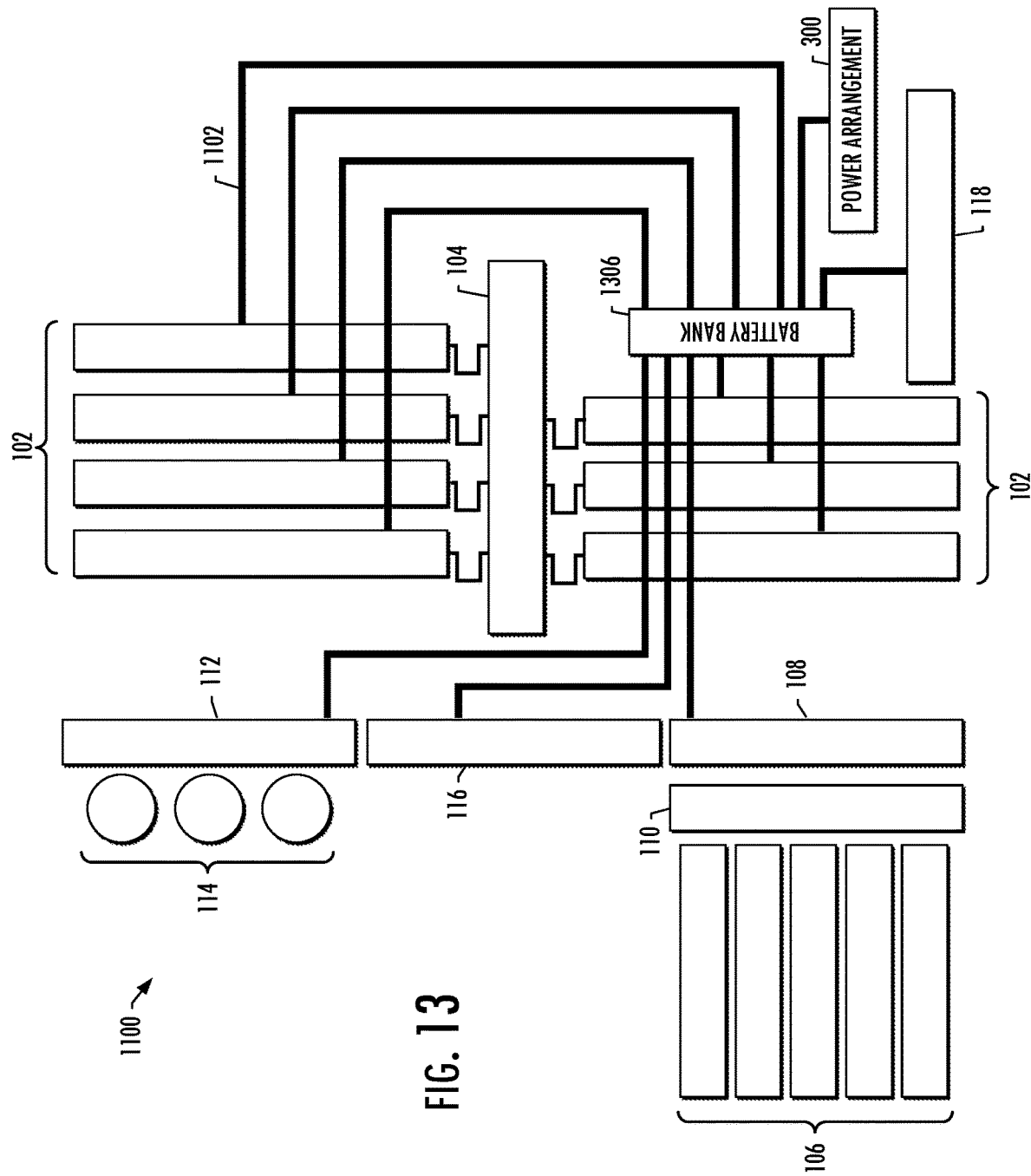
Figure 14:
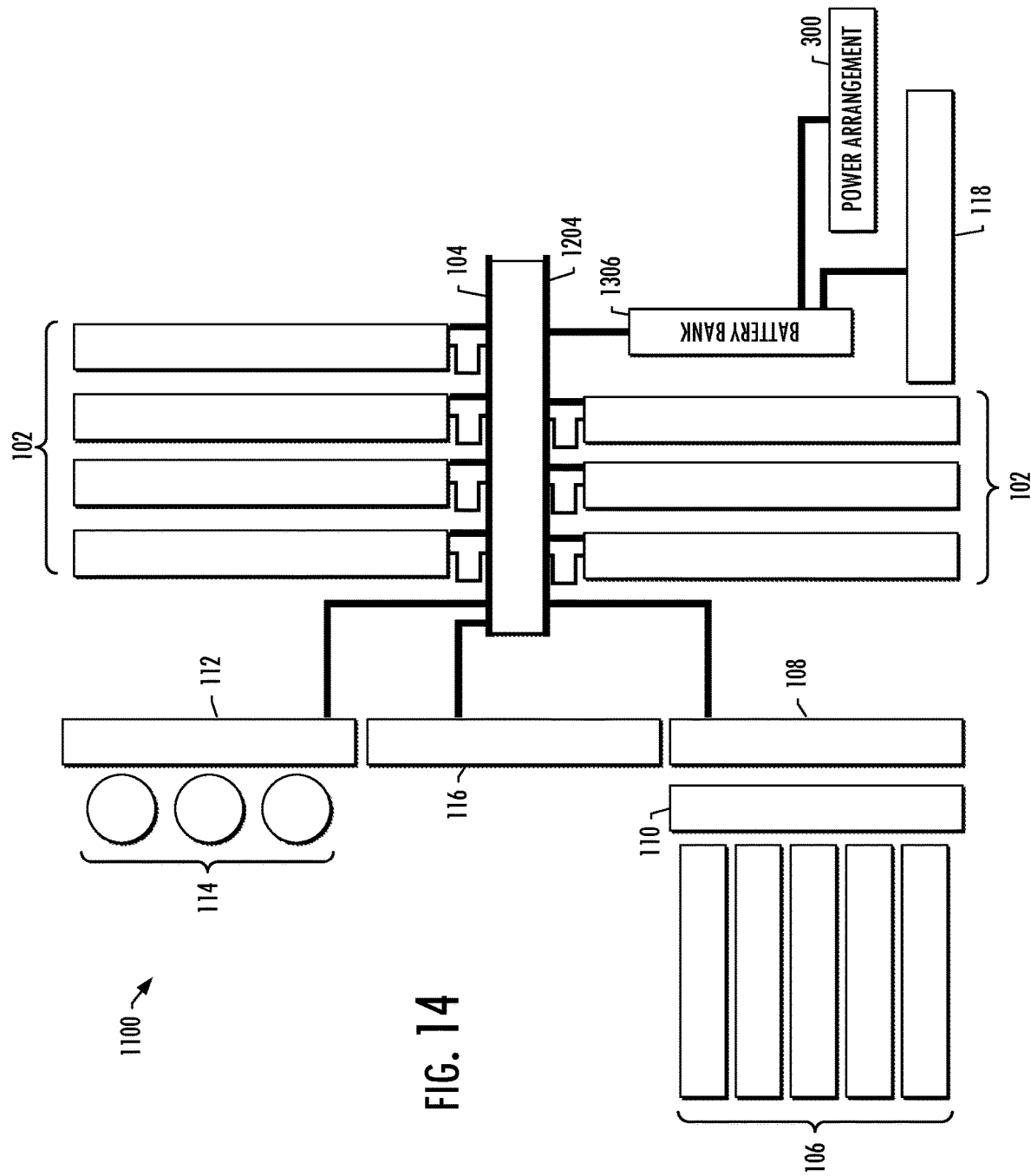

As shown in FIGS. 13 and 14, in some examples in which the power arrangement 300 is an electric power arrangement 400, and includes is an electric power source 402, the system further includes a battery bank 1306 chargeable from the power generated by the electric power arrangement. The battery bank may supply power to the equipment as required. Prior to commencing operations, if the battery bank is charged and fuel to the power arrangement 300, the battery bank may act as a buffer to complete a job. In some examples, when the battery bank is charged, the power arrangement 300 may bypass the battery bank, and the battery bank may act as a hub to supply power to the hydraulic fracturing units 102 (and perhaps also the backside equipment).

FIG. 13 is similar to FIG. 11 in that the battery bank 1306 is directly connected to the hydraulic fracturing units 102 (and perhaps also the backside equipment) by respective power cables 1102. FIG. 14 is similar to FIG. 12 in that the system 1100 further includes the electric bus 1204 connecting the hydraulic fracturing units (and perhaps also the backside equipment) to the battery bank. In FIGS. 13 and 14, the battery bank is configured to power the respective auxiliary equipment 220 across the plurality of hydraulic fracturing units 102. Even further, in some examples, the battery bank is also connected to shore power from the external source of electric power (e.g., utility power grid via connection to the data center 118), from which the battery bank may also be chargeable and/or the respective auxiliary equipment may also be powerable.

To further illustrate example implementations of the present disclosure, FIG. 15 is a block diagram a particular electric power arrangement 1500 that in some examples may correspond to electric power arrangement 400 shown in FIG. 4. As shown, the electric power arrangement may include a diesel engine 1512 and an electric generator 1514 to supply power to the system. In some examples, the diesel engine is a 225-300 HP Caterpillar C7 (maximum power rating of 300 HP and a speed between 1,800 to 2,200 RPM), a 335-456 BHP Caterpillar C9 (maximum power rating of 456 HP and a speed between 1,800 to 2,200 RPM), or similar.

The diesel engine 1512 may be operatively coupled to the electric generator 1514 to supply electrical power to multiple electric drivers that power one or more auxiliary equipment such as cooling fans and lube oil pumps. Examples of a suitable electric generator include a Caterpillar Model SR4 200 KW, a Kato 200 KW Model A250180000, and the like. In some examples, the electric generator may be configured to provide 230/240-volt, 3-phase power or 460/480-volt, 3-phase power to individual variable frequency drives (VFDs) 1504 to power various motors 1506 of the auxiliary equipment.

The VFD 1504 may include a full wave three-phase rectifier configured to convert incoming three-phase AC voltage to a desired DC voltage through a plurality (e.g., 9) of silicon controlled rectifiers (SCRs) or diodes. This DC voltage may then power those of the motors 1506 that are DC motors. Alternatively, the generated electrical current may be sent through an inverter at the prescribed voltage and synthesized sine wave frequency such that the VFDs may selectively control the operation of AC motors. This may be by the providing prescribed voltage and synthesized sine wave frequency the VFD selectively controls the speed and direction of the AC motors. In some examples, the VFDs may be configured to directly supply AC power to the AC motors, thereby eliminating the use on an external inverter. One example of a suitable VFD with connections to an AC motor is depicted in FIG. 16. Examples of suitable VFDs include a Delta #CP 2000 VFD rated for 230 or 460 VAC, max power 1 to 536 HP, a Danfoss #130B0888 FC301 460V 3-phase, A Danfoss Vacon 100X, and the like.

The VFDs 1504 may power the motors 1506 of various auxiliary equipment 1520, the operation of each of which may add a load onto the electric power arrangement 1500. Examples of various auxiliary equipment and respective approximate loads include:

lube oil pump to the gearbox (1 HP)
cooling fan to gearbox lube oil pump (15 HP)
lube oil pump to the power end (15 HP)
cooling fan to the power end lube oil pump×2 (15 HP each)
cooling fan to the CAT C9 engine (10 HP)
CAT C9 engine air cooling fan (10 HP)
screw type air compressor to provide 150 pounds per square inch (PSI) air for fuel equipment intensifier to amplify to >200 PSI (7.5 HP) with air dryer (0.75 HP)
greater equipment for the fracturing pump (0.25 HP)
air intake blower fan motors×2 (40 HP each)
GTE controller (1 HP)
hydraulic starter pump equipment (60 HP)
turbine lube cooling fan (4 HP)
telescope exhaust winch×2 (1 HP each)
master PLC for VFD/electric generator (2 HP)
Total 236.5 HP/176 kW Each auxiliary equipment may add a horsepower drag on the overall electric power arrangement 1500, and this drag may depend on characteristics of the auxiliary equipment.

As suggested above, in some examples, the electric power arrangement 1500 may be more efficient with finer control of cooling and lubrication through feedback loops continuously monitored by processing circuitry such as a programmable logic controller (PLC). Examples of suitable controllers include a Parker IQAN™ controller, a Danfoss Plus+One® controller, or a custom process controller.

In some examples, the electric power arrangement 1500 may also be powered by shore power 1516 through a separate connection to an external source of electric power. If using shore power, a selectable switch may be configured to selectably separate the electric generator 1514 from the shore power. In some examples, the electric power arrangement may include or be connected to a battery bank 1518 that may supply power in the case of diesel engine failure or shore power failure.

Further consider examples of the system 1100 in FIGS. 11-14 in which the hydraulic fracturing units are connected to a power arrangement 300 configured to power the respective auxiliary equipment 220 across hydraulic fracturing units 102. Also consider a particular example in which the system includes seven hydraulic fracturing units. Taking into account efficiency of the electric generator 1514 (commonly 80%), a minimum of 300 HP may be distributed per hydraulic fracturing unit. The total demand of the hydraulic fracturing units may depend on how many are rigged up. Further including backside equipment, the electric generator may power the following with respective approximate loads:

hydraulic fracturing units (×7)=1655.5 HP
chemical unit=107 HP
hydration unit=665 HP
sand tanks=750 HP
blender=1433 HP
data center=500 HP The total horsepower supplied may be approximately 5110 HP (3806 kW). In the case of an electric generator 1514 driven by a GTE, one example of a suitable GTE is a Vericor TF50 turbine with a rated to 5600 HP (4200 kW).

FIG. 17 is a block diagram a particular hydraulic power arrangement 1700 that in some examples may correspond to hydraulic power arrangement 500 shown in FIG. 5. As shown, the hydraulic power arrangement includes an electric motor 1710 such as a 300 HP electric motor coupled to a module hydraulic pump drive 1714 with multiple (e.g., four) output gear shafts. The number of module hydraulic pump drives and output gear shafts may be varied to suit a particular application. Examples of a suitable electric motor include a Grainger 300 HP fire pump motor (460 V, 3-phase, 1780 RPM), a Baldor 300 HP motor (460 V, 3-phase, 1780 RPM), or the like. One example of a suitable module hydraulic pump drive is a Durst hydraulic pump drive gearbox #4PD08.

The module hydraulic pump drive 1714 may power auxiliary equipment 1720 though motors and hydraulic pumps 1712, which may be coupled to the module hydraulic pump drive individually or in tandem. In this regard, the hydraulic pumps may be configured to supply hydraulic fluid to corresponding hydraulic motors of various auxiliary equipment. These again may power auxiliary equipment such as cooling fans and lube oil pumps. Examples of various auxiliary equipment and respective approximate loads include:

lube oil pump to the gearbox (1 HP)
cooling fan to gearbox lube oil pump (8 HP)
lube oil pump to the power end low pressure (11 HP)
lube oil pump to the power end high pressure (18 HP)
cooling fan to the power end lube oil pump (40 HP)
greater equipment for the fracturing pump (1 HP)
Turbine Fuel Pump (1.5 HP)
Turbine Washing System (1 HP)
Turbine/Gearbox/Hydraulic Cooler Fan (40 HP)
Air exchange Fans (10 HP)
Hydraulic Pump for Turbine Starter, Lid openings, Compressor etc (70 HP)
Total 201 HP/150.37 kW This hydraulic power arrangement 1700 does not rely on a diesel engine but instead an electric motor that may operate off shore power from an external source of electric power that may supply power to multiple units on a jobsite, thereby eliminating at least several components that may be required for a diesel engine (e.g., a fuel pump, an air compressor, an engine cooling fan).

FIG. 18 is a block diagram another particular power arrangement 1800 that may be connected to a powertrain 1802 that corresponds to powertrain 208. As shown, the powertrain includes a housing with a GTE 1814 coupled to a turbine gearbox 1816 (reduction transmission) connected to a drive shaft 1818, which, in turn, may be connected to the pump such as via an input shaft or input flange of the pump. The hydraulic power source includes a plurality of PTOs 1804 connected to the turbine gearbox, and at least one of the PTOs may be connected to an alternator 1806 or other electric generator. The alternator may be configured to generate electric power from which auxiliary equipment may be powered, and any unused electric power may be feedback to an external source such as the utility power grid.

In some examples, the alternator 1806 may be engaged with or disengaged from the PTO 1804 via a hydraulic or pneumatic clutch to allow the GTE 1814 to direct more power through the drivetrain and into the pump if needed. When disengaged from the PTO, the auxiliary equipment may be powered from shore power connections and other generated grid power. When the alternator is engaged with the PTO, as well as feeding auxiliary equipment such as cooling fans and compressors, an uninterrupted power source (UPS) 1808 may be constantly charged during pumping operations. This UPS may be used to solely drive a hydraulic pump that will be used to start the GTE by feeding hydraulic power to the motor starter.

An active front end (AFE) 1810 may be placed on the two outputs of the alternator 1806 to change AC voltage to DC. FIG. 19 illustrates one example of a suitable AFE. As shown, the AFE may include IBGTs (insulated bipolar gate resistors), which may ensue that harmonics and other power sent through the AFE are dampened and power efficiency is increased. As well as treating alternator power, another AFE may also treat raw shore power coming into the grid in the same way.

FIG. 20 is a flowchart illustrating various operations in a method 2000 of fracturing a well, according to various example implementations. The method includes arranging one or more hydraulic fracturing units 102, 702, as shown at block 2002. Each hydraulic fracturing unit includes a reciprocating plunger pump 206 configured to pump a fracturing fluid, a powertrain 208 configured to power the reciprocating plunger pump, and auxiliary equipment 220 driven to support operation of the hydraulic fracturing unit including the reciprocating plunger pump and the powertrain. The method includes arranging one or more electric power arrangements 400 to power the auxiliary equipment, as shown at block 2004. And the method includes operating the powertrain to power the reciprocating plunger pump to pump the fracturing fluid, and the electric power arrangement to power the auxiliary equipment, as shown at block 2006.

FIG. 21 is a flowchart illustrating various operations in a method 2100 of fracturing a well, according to various other example implementations. The method includes arranging one or more hydraulic fracturing units 102, 702, as shown at block 2102. Each hydraulic fracturing unit includes a reciprocating plunger pump 206 configured to pump a fracturing fluid, a powertrain 208 configured to power the reciprocating plunger pump, and auxiliary equipment 220 driven to support operation of the hydraulic fracturing unit including the reciprocating plunger pump and the powertrain. The method includes arranging one or more hydraulic power arrangements 500, 600 to power the auxiliary equipment, as shown at block 2104. And the method includes operating the powertrain to power the reciprocating plunger pump to pump the fracturing fluid, and the hydraulic power arrangement to power the auxiliary equipment, as shown at block 2106.

As described above and reiterated below with further example implementation details, various example implementations are disclosed herein that provide power arrangements and methods for powering of auxiliary equipment onboard a hydraulic fracturing unit such as a DDT hydraulic fracturing unit or trailer. The auxiliary equipment include, for example, cooling of process fluids through heat exchangers, pumping equipment, compressor units, winches and linear actuators, electrical control equipment, heats/coolers and hydraulic equipment. The power arrangements of example implementations may be configurable and may be adjusted to suit the needs of each individual scenario and situation.

Some example implementations of a power arrangement include an engine or prime mover onboard the gooseneck area of a GTE-driven hydraulic fracturing unit. The engine/prime mover may be connected to an electric power generator such as a PM motor or a hydraulic pump drive with one or more pumps.

Some example implementations include a diesel reciprocating engine onboard the GTE-driven hydraulic fracturing unit, and other example implementations includes an electric motor in place of the diesel engine. The location of the engine/motor may be the gooseneck area of a trailer, but the design of the trailer may permit installation of the engine/motor on the rear axles of the trailer.

In examples including the diesel engine, it may be equipped with supporting equipment such as fuel reservoirs, coolant reservoirs, battery banks, diesel exhaust fluid tanks and cooling fans. The cooling fan on the diesel engine may be supplied by the engine manufacturer and mounted from a PTO located on the engine or it may be made external and powered from the hydraulic power network coming from the hydraulic pump drive. In another implementation, the diesel engine may be replaced with an electric motor that when installed is accompanied by electric switch gear that houses overload protection as well as a form of isolating the electric motor. Directly mounted from the diesel engine may be the hydraulic pump drive, which may be connected to the electric motor in another implementation.

The hydraulic pump drive may have a female spur shaft connection that is installed onto the diesel engine or electric motor, and the two components may be secured via a bell housing that connects a face of the engine/motor to a face of the hydraulic pump drive. Once installed the hydraulic pump drive may be configured to house up to four pumps but will be rated by the total amount of horse power and torque it may yield at each output gear. Depending on the application, the use of a large displacement single pump directly coupled to the diesel engine may be beneficial. But there may be equal portion of components over the trailer that are operating at different pressures, such as a compressor and fans that operate at a flow that will generate 2000 PSI, and the pumps may operate at 3000 PSI at rated flow. Therefore, a variable displacement hydraulic pump with a compensator setting of 2000 PSI, and another pump with a compensator setting of 3000 PSI, may meet pressure requirements of each circuit bearing in mind that the output flow rate of each pumps should meet the flow demand from all components.

Depending on the configuration of pumps there may be multiple hydraulic reservoirs installed on the hydraulic fracturing unit that would allow for each individual pump installed on the hydraulic pump drive to draw fluid from. This may mean that a pump with a greater suction vacuum would not take away fluid from a pump with a small displacement therefore a smaller suction pressure. Alternatively pump suction lines may be positioned in a way this does not happen, but the size of the reservoir and mounting location of the reservoir dictate this. The space taken up by the hydraulic reservoir may depend on flow demand within the auxiliary equipment. The dwell time for fluid may be greater in the individual or group of reservoirs due to the hydraulic power network being open circuit, meaning that the displaced fluid from the pump may go to the desired component and then return to tank opposed to returning to the pumps suction side.

The hydraulic power network coming from the hydraulic pump drive may be equipped with filtration in the form of single or double housings that ensure fluid cleanliness is maintained to the best industry standard that is usually dictated by the International Organization for Standardization (ISO) fluid cleanliness classification.

A diesel engine directly coupled to a hydraulic pump drive that is installed with hydraulic pumps may allow for great versatility. The adjustment of pump pressure and flow settings may allow the pumps to operate at their maximum efficiency while still ensuring they meet the power demands of the auxiliary equipment.

Working in conjunction with the hydraulic pumps may be hydraulic directional control valves that isolate fluid going to individual circuits, and when actuated, allow a valve spool to shift and direct flow through the ports. In the case of hydraulic motors driving fluid pumps and fans, these components may be controlled to operate in a single direction to avoid damage to pumps and mis-operation of fans. This may be done by selecting a directional control valve with a closed center and two positions.

In a de-energized state there may be no flow through the valve, resulting in the pump swash plate to move to the neutral position and stop displacing fluid. When operated via an electric signal energizing the solenoid from an electric control system, or commonly referred to as a supervisory control system (SCS), flow may be allowed to pass through the control valve to the designated auxiliary equipment that may operate a hydraulic motor. Return fluid may also be plumbed back to the hydraulic control valve and passed to a return line where it may be diverted back to the hydraulic reservoir. The control valves may be installed in multiple valves assemblies, commonly referred to as a "valve bank."

Another part of the hydraulic power arrangement may be cooling circuits. The operation of hydraulic power networks may generate heat as the fluid flowing through different orifices, and the resulting pressure drop yields heat into the fluid that may not only degrade fluid lubrication properties but also cause problems to the components being operated with the fluid. To mitigate this, hydraulic cooling circuits may be installed that are activated by thermostatic control valves. When the fluid gets too hot, the valve may open and diverts fluid though a fan driven heat exchanger ensuring that its cooled prior to returning to the reservoir and being introduced back into the hydraulic power network.

The diesel engine and hydraulic package may be configured to easily fit onto the gooseneck of a standard hydraulic fracturing unit while still ensuring space for additional components such as reservoirs, heat exchangers and compressors. Hydraulic pumps installed from the hydraulic pump drive or directly from the engine are often very versatile. Ensuring that the flow requirements may be met, the pumps pressure compensator setting, as well as the introduction of load sensing, may ensure that only the required amount of power is drawn from the hydraulic pump. This may mean that the engine is operated at the power required, and that wasted energy and fuel is eradicated, thereby improving efficiency.

The complexity of an individual hydraulic power network is not high, and the introduction of a hydraulic pump drive with multiple individual network branches may still maintain a simple approach without the need to interface all pumps into a single common pressure line. The versatility of adding hydraulic pump drives with different output gears while still maintaining the same circuitry in place may be a benefit of a driven hydraulic network branch and allow for expansion in circuitry without the need to perform complex adjustments.

Operation of a circuit during hydraulic fracturing may be as follows. The SCS may operate from a battery storage device, which may be charged from an alternator or shore power provided to the implementation inclusive of an electric motor driving the hydraulic power network. The SCS may interface with the diesel engine through the engines electric control module (ECM), and from this, the engine may be given start, stop or throttle commands. Engine equipment information may also be sent through J1939 communication protocol.

During startup of the hydraulic fracturing unit, the diesel engine may be sent a start command and reach idle speed; or in another example implementation, electric power brought onboard may enter a VFD. The SCS may send a digital output to the drive to start up. In addition to that digital signal, an analog signal in the state of 4-20 mA or 0-10V may be used to control the speed. The SCS may command the prime mover on the diesel engine to then go to a run speed which is typically 1900 RPM for most systems but could be as high as 2100 or as low as 1700 RPM. This speed may allow the hydraulic power source to operate at maximum power output and begin supplying flow into the hydraulic power network. The directional control valves may then be operated in a sequence ensuring that all pre-conditions are met before bringing the turbine engine online.

When the fuel and lubrication pumps are operating within the correct parameters, the GTE start motor may be operated. This axial motor may be installed on a gearbox or other transmission toward a cold end of the turbine engine, and it may receive hydraulic flow. When the GTE reaches an idle speed, a sprag clutch in the turbine starter motor assembly may disengage, allowing combustion within the turbine combustion chamber to maintain the turbine speed. Upon reaching the idle speed, a signal may be removed from the hydraulic control valves to halt fluid to the starter motor. The hydraulic power arrangement may then operate the turbine engine and pump auxiliary equipment to distribute hydraulic flow through the control valves as per logic programmed into the SCS. As with startup of the diesel engine or operation of the electric motor, the SCS may be responsible for sending shutdown signals to either the diesel engine's ECM or electric motor frequency drive.

In other example implementations, the hydraulic power arrangement may be replaced with an electric motor such as a PM motor that is directly coupled to the engine output shaft and connected to the engine housing via a bell housing adapter. However, a splined coupling may interface the two shafts, and a coupling may connect these splined adapters together. The PM motor may operate at an optimal speed of 1900 RPM to generate 500 VAC power. At this speed and power generation, an electric generator may yield a power factor of 0.93 making the generator highly efficient.

The electric generator may also include a cooling circuit that is operable between 5-10 gallons per minute (GPM) and acts as a heat exchanger through the generator ensuring that the temperature on the generator winding does not exceed 175 degrees Celsius. A small pump to circulate this fluid may be first driven from battery storage device until the electric generator comes online and begins to re-charge the battery storage device and then power its own cooling pump.

Coming from the generator may be the electric conditioning station that may also be located on the gooseneck in a water and dust proof IP66 enclosure. A cable carrying three-phase power may enter the enclosure into a main isolation breaker with overload protection, and from this, the power cable may be run into an AFE drive that may condition the signal into a DC voltage. Control of this AFE may be through the SCS, and communication may be carried out via modbus protocol. Downstream of the AFE may be a main DC bus bar that may hold the electric potential to distribute power to each individual control circuit around the hydraulic fracturing unit.

From the bus bar there may be an individual circuit protection breaker for each control circuit that may be equipped with overload protection. In the event the current drawn from the motor in the control circuit is too great, the overload protection may trip the breaker resulting in power loss to that circuit and protection of all components in that circuit. From these individual circuit breakers, armored and shielded cables may then leave the enclosure through bulkhead connections equipped with explosion proof glands and assembly methods that ensure the integrity of the main switch gear assembly may be protected from potentially combustible gases. The cables may be secured in a cable tray that may then run to areas in which the electric motors may be in place.

Prior to terminating the electric supply cables to the motor, the cables may first be terminated to an inverter drive that may convert the DC voltage into an AC voltage. The benefit of this may be the ease of sourcing AC electric motors and their lower capital costs. The inverter may condition the power coming in and leaving the drive. The inverter may also allow for proportional speed control of the motor and soft start functioning of the motor to reduce a current rush into the motor potentially tripping any circuit overload protection in the drive or back at the main isolator coming from the common bus bar.

The electric motors connected to the electric drives may be used in place of hydraulic motors as detailed in other example implementation but may still be fluidly connected to the driven equipment such as pumps, fans, compressors with the use of couplings and bell housing adapters. Other driven equipment may be driven with the use of electric motors and are contemplated herein.

A method of operation of the power arrangement of some examples may be as follows. The engine may be brought online in a similar manor to the previously described implementation in which the SCS may send a start signal to the diesel engine ECM via J1939 communication protocol. The engine may be brought online to a speed of 1900 RPM, at which point the electric generator may be producing 500 VAC electric power with the electric potential of up to 223 KW.

The alternating current power form the electric generator may enter the electric conditioning assembly including the main isolator and the AFE rectifier that may convert the power to DC and distribute it over the electric bus bar. Current may be then able to flow into the main isolator for each electric circuit. The current may then flow around the hydraulic fracturing unit via the correctly sizes armor shielded electric cable into the inverter drive. The inverters may be networked and communicated with from the SCS. The SCS may function the inverter drive and alter the frequency in which the IBGTs of the AFE sequence, which may result in the frequency leaving the drive to the motor to be controlled, and thereby controlling the speed of which the motors turns.

The power arrangement of these example implementations may allow for very accurate control of the individual circuitry. The analog signals to the drives may ensure that the frequency provided to the electric motors allows for exact RPMs to be met within 5-10 RPM tolerance. Electric motors may also provide a robust option for driving pumps and other auxiliary equipment. The lack of potential fluid contamination or fluid degradation usually allows these motors to stay in service longer ensuring that load bearings are greased and correct mounting of the motor may be performed. This implementation to drive auxiliary equipment of the hydraulic fracturing unit with electric motors may also provide benefit from lack of fluid travelling the entirety of the hydraulic fracturing unit, which may be susceptible to pressure drops and leaks.

As previously mentioned, the ability to share generated power may be a benefit of the diesel engine and generator set up. For example, if ten hydraulic fracturing units are on location, and each generator produces more power than may be required on the individual hydraulic fracturing unit, a shared power configuration could see a portion of the ten hydraulic fracturing unit gen-sets taken offline and the remainder of the hydraulic fracturing units providing all hydraulic fracturing units with the total amount of electric energy required.

Another example implementation of a method to power auxiliary equipment onboard hydraulic fracturing units may utilize the GTE transmission and include PTOs on the transmission to power a smaller electric generator and a single multistage pump. In some of these examples, a transmission such as a gearbox with a single input and output shaft may be modified to account for two additional PTOs positioned either side of the main output shaft or flange. These PTOs may be equipped with clutches that may be operated either pneumatically or hydraulically (or electrically in other example implementations).

As well as the installation of the transmission with the PTOs, additional equipment may be installed onto the GTE-driven hydraulic fracturing unit to ensure that a controlled startup may be performed to get to a point where it may be self-sustained from its own operation. Taking this into account, a battery bank with one or more high-powered lithium ion batteries may be used to provide the starting power for onboard auxiliary equipment such as lube and fuel pumps as well as powering the electric motor that may be coupled to the GTE starter gear. Once the GTE is at running speed and there is motion at the output shaft, the clutches may be engaged to allow for the pumps and electric generator to receive torque and motion from the transmission and start to displace fluid and generate power.

A single pump may address the needs of the reciprocating fracturing pump, and the single pump be a multistage pump that allows fluid to enter both low and high pressure sides of the pump. In other example implementations, the electric generator installed onto the diesel engine may supply enough power to all of the onboard auxiliary equipment. This may be not feasible when using a PTO from the transmission due to the footprint available and the large cantilever loading from the transmission as it may already support the mass of the GTE. Therefore, by taking away the reciprocating pump lube power requirements from the total KW load, there may or may not be use of a smaller generator capable of driving small motors coupled to fans that could range from 1 to 5 HP, as well as low pressure low flow fuel pumps and transmission lube pumps.

As in other implementations, the SCS may be powered from a separate battery bank but may still allow for generated power to replenish the battery charge when operational. The remaining auxiliary equipment to be powered from the smaller generator coupled to the transmission may follow the same assembly methodology as stated above with respect to an earlier example implementation.

According to these more recently-described example implementations, a method of operation may be as follows. The SCS may be online and command the GTE's primary auxiliary equipment to come online, which may result in fuel pumps and lube pumps to start. The GTE starter motor may then be functioned, allowing the GTE to reach an idle speed, after which the electric motor coupled to the starter gear may be disengaged and its power may be isolated. Once the power output shaft is functioned, and the GTE torque and power are transferred to the transmission, the clutches may be operated allowing the multistage pump and electric generator to be engaged and start rotating. The power from the electric generator may be then converted to DC through an AFE rectifier as described above, and distributed over a common DC bus. The power may be then distributed over the hydraulic fracturing unit and sent to drives that are controlling the speed of electric motors.

This application is a continuation of U.S. Non-Provisional application Ser. No. 18/116,383, filed Mar. 2, 2023, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,859,482, issued Jan. 2, 2024, which is a continuation of U.S. Non-Provisional application Ser. No. 17/976,095, filed Oct. 28, 2022, titled "POWER. SOURCES AND TRANSMISSION NETWORKS FOR AUXILIARY EQUIPMENT ONBOARD HYDRAULIC FRACTURING UNITS AND ASSOCIATED METHODS," which is a continuation of U.S. Non-Provisional application Ser. No. 17/555,815, filed Dec. 20, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,530,602, issued Dec. 20, 2022, which is a continuation of U.S. Non-Provisional application Ser. No. 17/203,002, filed Mar. 16, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,236,739, issued Feb. 1, 2022, which is a divisional of U.S. Non-Provisional application Ser. No. 16/946,079, filed Jun. 5, 2020, titled "POWER. SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 10,989,180, issued Apr. 27, 2021, which claims the benefit of and priority to U.S. Provisional Patent Application No. 62/899,971, filed Sep. 13, 2019, titled "AUXILIARY DRIVE SYSTEMS AND ALTERNATIVE POWER SOURCES," the entire disclosures of each of which are incorporated herein by reference.

Many modifications and other implementations of the disclosure will come to mind to one skilled in the art to which this disclosure pertains having the benefit of the teachings presented in the foregoing descriptions and the associated figures. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. A system for fracturing a well, the system comprising:
a hydraulic fracturing unit comprising:
a chassis;
a reciprocating plunger pump connected to the chassis and configured to pump a fracturing fluid;
a powertrain connected to the chassis and configured to power the reciprocating plunger pump, the powertrain including a turbine engine and a drivetrain; and
auxiliary equipment located onboard the chassis, the auxiliary equipment driven by one or more electric motors to support operation of the hydraulic fracturing unit including the reciprocating plunger pump and the powertrain;
one or more electric power arrangements configured to power the auxiliary equipment, the one or more electric power arrangements comprising:
an engine-generator set configured to generate electric power, and
an electric power network configured to deliver electric power generated by the engine-generator set to the auxiliary equipment, the electric power network providing electrical communication between the engine-generator set and the one or more electric motors of the hydraulic fracturing unit, wherein the one or more electric power arrangements include a battery bank chargeable from the electric power generated by the engine-generator set, wherein the one or more electric power arrangements is configured to selectively (i) operate the battery bank as a buffer or (ii) bypass the battery bank, allowing the battery bank to act as a hub to supply power to the hydraulic fracturing unit; and
a manifold connected to the reciprocating plunger pump of the hydraulic fracturing unit, the manifold configured to deliver fracturing fluid from the reciprocating plunger pump to the well.

2. The system of claim 1, wherein the engine-generator set includes a diesel engine and an electric motor generator, the diesel engine configured to drive the electric motor generator to generate the electric power.

3. The system of claim 1, wherein the engine-generator set includes a gas turbine engine and an electric generator, the gas turbine engine configured to drive the electric generator to generate the electric power.

4. The system of claim 1, wherein the electric power network is switchably connectable to one or more of a utility power grid, the battery bank, or another engine-generator set and is configured to deliver electric power generated by the engine-generator set to the one or more electric motors to drive auxiliary equipment of the hydraulic fracturing unit and to be switchably connected to the one or more of the utility power grid, the battery bank, or the another engine-generator set to deliver power to the one or more electric motors responsive to a failure or fault of the engine-generator set.

5. The system of claim 4, wherein the one or more electric power arrangements further comprises a connection to the utility power grid, and the electric power network is configured to switchably connect the utility power grid to the one or more electric motors to deliver power to the electric motors responsive to the failure or fault of the engine-generator set.

6. The system of claim 4, wherein the electric power network is configured to switchably connect the battery bank to the one or more electric motors to deliver power to the one or more electric motors responsive to the failure or fault of the engine-generator set.

7. The system of claim 4, wherein the electric power network further comprises a connection to a second hydraulic fracturing unit and is configured to deliver electric power generated by the engine-generator set to auxiliary equipment located onboard a chassis of the second hydraulic fracturing unit.

8. The system of claim 1, wherein the one or more electric power arrangements include a plurality of electric power arrangements, each of the plurality of electric power arrangements being connected to a chassis of a respective one of a plurality of hydraulic fracturing units.

9. The system of claim 4, wherein the one or more electric power arrangements further comprises a second engine-generator set, and
wherein the electric power network is configured to switchably connect the second engine-generator set to the one or more electric motors to deliver power to the electric motors responsive to the failure or fault of the engine-generator set.

10. A system for fracturing a well, the system comprising:
a hydraulic fracturing unit comprising:
a chassis;
a reciprocating plunger pump connected to the chassis and configured to pump a fracturing fluid;
a powertrain connected to the chassis and configured to power the reciprocating plunger pump, the powertrain including an engine and a drivetrain comprising a reduction transmission; and
auxiliary equipment located onboard the chassis, the auxiliary equipment comprising a lube oil pump coupled to the reduction transmission, the auxiliary equipment driven by one or more electric motors to support operation of the hydraulic fracturing unit including the reciprocating plunger pump and the powertrain;
one or more electric power arrangements configured to power the auxiliary equipment, the one or more electric power arrangements comprising:
an engine-generator set configured to generate electric power, and
an electric power network configured to deliver electric power generated by the engine-generator set to the auxiliary equipment, the electric power network providing electrical communication between the engine-generator set and the one or more electric motors of the hydraulic fracturing unit, wherein the one or more electric power arrangements include a battery bank chargeable from the electric power generated by the engine-generator set, wherein the one or more electric power arrangements is configured to selectively (i) operate the battery bank as a buffer or (ii) bypass the battery bank, allowing the battery bank to act as a hub to supply power to the hydraulic fracturing unit; and
a manifold connected to the reciprocating plunger pump of the hydraulic fracturing unit, the manifold configured to deliver fracturing fluid from the reciprocating plunger pump to the well.

11. The system of claim 10, wherein the electric power network is switchably connectable to one or more of a utility power grid, the battery bank, or another engine-generator set and is configured to deliver electric power generated by the engine-generator set to the one or more electric motors to drive auxiliary equipment of the hydraulic fracturing unit and to be switchably connected to the one or more of the utility power grid, the battery bank, or the another engine-generator set to deliver power to the one or more electric motors responsive to a failure or fault of the engine-generator set.

12. The system of claim 11, wherein the one or more electric power arrangements further comprises a connection to the utility power grid, and the electric power network is configured to switchably connect the utility power grid to the one or more electric motors to deliver power to the electric motors responsive to the failure or fault of the engine-generator set.

13. The system of claim 11, wherein the electric power network is configured to switchably connect the battery bank to the one or more electric motors to deliver power to the one or more electric motors responsive to the failure or fault of the engine-generator set.

14. The system of claim 11, wherein the electric power network further comprises a connection to a second hydraulic fracturing unit and is configured to deliver electric power generated by the engine-generator set to auxiliary equipment located onboard a chassis of the second hydraulic fracturing unit.

15. The system of claim 11, wherein the one or more electric power arrangements further comprises a second engine-generator set, and
wherein the electric power network is configured to switchably connect the second engine-generator set to the one or more electric motors to deliver power to the electric motors responsive to the failure or fault of the engine-generator set.

16. The system of claim 10, wherein the one or more electric power arrangements include a plurality of electric power arrangements, each of the plurality of electric power arrangements being connected to a chassis of a respective one of a plurality of hydraulic fracturing units.

17. A system for fracturing a well, the system comprising:
a hydraulic fracturing unit comprising:
a chassis;
a reciprocating plunger pump connected to the chassis and configured to pump a fracturing fluid;
a powertrain connected to the chassis and configured to power the reciprocating plunger pump, the powertrain including an engine and a drivetrain comprising a reduction transmission;
one or more power takeoffs (PTOs) connected to the drivetrain; and
auxiliary equipment located onboard the chassis, the auxiliary equipment comprising a lube oil pump coupled to the reduction transmission, the auxiliary equipment driven by one or more electric motors to support operation of the hydraulic fracturing unit including the reciprocating plunger pump and the powertrain;
an electric power arrangement configured to power the auxiliary equipment, the electric power arrangement comprising:
an engine-generator set configured to generate electric power, and
an electric power network configured to deliver electric power generated by the engine-generator set to the auxiliary equipment, the electric power network providing electrical communication between the engine-generator set and the one or more electric motors of the hydraulic fracturing unit, wherein the electric power arrangement includes a battery bank chargeable from the electric power generated by the engine-generator set, wherein the electric power arrangement is configured to selectively (i) operate the battery bank as a buffer or (ii) bypass the battery bank to act as a hub, allowing the battery bank to supply power to the hydraulic fracturing unit; and a manifold connected to the reciprocating plunger pump of the hydraulic fracturing unit, the manifold configured to deliver fracturing fluid from the reciprocating plunger pump to the well.

18. The system of claim 17, wherein at least one of the one or more PTOs is connected to an alternator configured to generate electric power from which the auxiliary equipment may be powered.

19. The system of claim 17, wherein the electric power network is switchably connectable to one or more of a utility power grid, the battery bank, or another engine-generator set and is configured to deliver electric power generated by the engine-generator set to the one or more electric motors to drive auxiliary equipment of the hydraulic fracturing unit and to be switchably connected to the one or more of the utility power grid, the battery bank, or the another engine-generator set to deliver power to the one or more electric motors, and wherein electric power generated by the alternator and not utilized by the auxiliary equipment is transferred to the utility power grid or the battery bank.

\* \* \* \* \*